(12) United States Patent
Pinhasov et al.

(10) Patent No.: US 11,895,409 B2
(45) Date of Patent: Feb. 6, 2024

(54) IMAGE PROCESSING BASED ON OBJECT CATEGORIZATION

(71) Applicant: QUALCOMM Incorporated, San Diego, CA (US)

(72) Inventors: Eran Pinhasov, Zichron Yaakov (IL); Scott Cheng, Foothill Ranch, CA (US); Eran Scharam, Misgav (IL); Anatoly Gurevich, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/158,917

(22) Filed: Jan. 26, 2021

(65) Prior Publication Data

US 2022/0060619 A1 Feb. 24, 2022

Related U.S. Application Data

(60) Provisional application No. 63/068,333, filed on Aug. 20, 2020.

(51) Int. Cl.
*H04N 23/61* (2023.01)
*H04N 23/80* (2023.01)
(Continued)

(52) U.S. Cl.
CPC ............ *H04N 23/80* (2023.01); *G06V 10/10* (2022.01); *G06V 20/10* (2022.01); *G06V 20/35* (2022.01);
(Continued)

(58) Field of Classification Search
None
See application file for complete search history.

(56) References Cited

U.S. PATENT DOCUMENTS

2006/0098889 A1* 5/2006 Luo .......................... G06T 7/11
382/164
2008/0317358 A1 12/2008 Bressan et al.
(Continued)

OTHER PUBLICATIONS

Chiang H., et al., "Multiple Object Recognition with Focusing and Blurring", Course cs231n at Stanford.edu,reports/2016/, Jun. 23, 2016 (Jun. 23, 2016), XP055854198, XP055854197, pp. 1-7, Retrieved from the Internet: URL: http://cs231n.stanford.edu/reports/2016/pdfs/259_Report.pdf [retrieved—on Oct. 22, 2021] sect. 1-3.
(Continued)

*Primary Examiner* — James M Hannett
*Assistant Examiner* — Wesley J Chiu
(74) *Attorney, Agent, or Firm* — QUALCOMM Incorporated

(57) ABSTRACT

Examples are described for applying different settings for image capture to different portions of image data. For example, an image sensor can capture image data of a scene and can send the image data to an image signal processor (ISP) and a classification engine for processing. The classification engine can determine that a first object image region depicts a first category of object, and a second object image region depicts a second category of object. Different confidence regions of the image data can identify different degrees of confidence in the classifications. The ISP can generate an image by applying a different settings to the different portions of the image data. The different portions of the image data can be identified based on the object image regions and confidence regions.

32 Claims, 16 Drawing Sheets

(51) Int. Cl.
*G06V 20/10* (2022.01)
*G06V 20/00* (2022.01)
*H04N 1/60* (2006.01)
*G06V 10/10* (2022.01)
*H04N 23/66* (2023.01)
*H04N 23/70* (2023.01)
*H04N 101/00* (2006.01)
*H04N 23/88* (2023.01)

(52) U.S. Cl.
CPC ......... *H04N 1/6072* (2013.01); *H04N 1/6083* (2013.01); *H04N 23/61* (2023.01); *H04N 23/66* (2023.01); *H04N 23/70* (2023.01); *H04N 23/88* (2023.01); *H04N 2101/00* (2013.01)

(56) References Cited

U.S. PATENT DOCUMENTS

| | | | | |
|---|---|---|---|---|
| 2013/0177242 | A1* | 7/2013 | Adams, Jr. | G06T 3/403 |
| | | | | 382/167 |
| 2017/0148137 | A1* | 5/2017 | Tanaka | G06T 3/4007 |
| 2019/0279345 | A1* | 9/2019 | Kim | G06K 9/6256 |
| 2020/0053293 | A1* | 2/2020 | Lee | H04N 5/232935 |
| 2020/0412937 | A1* | 12/2020 | Huang | H04N 23/611 |
| 2021/0304366 | A1* | 9/2021 | Kim | H04N 9/646 |
| 2022/0189029 | A1* | 6/2022 | Mequanint | G06V 10/764 |

OTHER PUBLICATIONS

International Search Report and Written Opinion—PCT/US2021/042429—ISA/EPO—dated Nov. 5, 2021.

Kalantari N.K., et al., "Deep High Dynamic Range Imaging of Dynamic Scenes", ACM Transactions on Graphics, ACM, NY. US, vol. 36, No. 4, Jul. 20, 2017 (Jul. 20, 2017), 12 Pages, XP058372918, ISSN: 0730-0301, DOI:10.1145/3072959.3073609, sect. 1 and 3, figures 1.2.

Lee C., et al., "An Algorithm for Automatic Skin Smoothing in Digital Portraits", 2009 16th IEEE International Conference on Image Processing (ICIP), IEEE, Piscataway, NJ, USA, Nov. 7, 2009 (Nov. 7, 2009), pp. 3149-3152, XP031629094, ISBN: 978-1-4244-5653-6, sect.2 and 3.

Liu Y., et al., "Multi-Focus Image Fusion with a Deep Convolutional Neural Network", Information Fusion, Elsevier, US, vol. 36, Dec. 5, 2016 (Dec. 5, 2016), pp. 191-207, XP029899693, ISSN: 1566-535, DOI:10.1016/J.INFFUS.2016.12.001 sect. 1 and 3, figure 1.

* cited by examiner

Multiplication 510:

Offset 520:

Logic 530:

Second category map 1020: upscaled using CMUS (nearest-neighbor upscaling modified with spatial weight filtering)

First category map 1010: upscaled using nearest-neighbor upscaling

IMAGE PROCESSING BASED ON OBJECT CATEGORIZATION

CROSS-REFERENCE TO RELATED APPLICATIONS

This application claims the benefit of U.S. Provisional Application No. 63/068,333, filed Aug. 20, 2020 and titled "Image Processing Based on Object Categorization," which is hereby incorporated by reference in its entirety and for all purposes.

FIELD

This application is related to image capture and image processing. More specifically, this application relates to systems and methods of automatically guiding image processing of a photograph based on categorization of objects in a photographed scene.

BACKGROUND

Image capture devices capture images by first light from a scene using an image sensor with an array of photodiodes. An image signal processor (ISP) then processes the raw image data captured by the photodiodes of the image sensor into an image that can be stored and viewed by a user. How the scene is depicted in the image depends in part on capture settings that control how much light is received by the image sensor, such as exposure time settings and aperture size settings. How the scene is depicted in the image also depends on how the ISP is tuned to process the photodiode data captured by the image sensor into an image.

Traditionally, an ISP of an image capture device is only tuned once, during manufacturing. The tuning of the ISP affects how every image is processed in that image capture device, and affects every pixel of every image. Users typically expect image capture devices to capture high quality images regardless of what scene is photographed. To avoid situations where an image capture device cannot properly photograph certain types of scenes, the tuning of ISPs is generally selected to work reasonably well for as many types of scenes as possible. Because of this, however, the tuning of traditional ISPs is generally not optimal for photographing all types of scenes.

SUMMARY

Systems and techniques are described herein for determining and applying different ISP settings for different image regions. In some examples, an image capture and processing device can process raw image data captured by an image sensor using the different ISP settings for the different image regions. In some cases, a classification engine can partition the raw image data into the different object image regions based on detection of different types of objects within the different image regions in the raw image data. By applying different ISP settings for different regions in an image, the ISP is optimized for the types of objects depicted in the image. In one illustrative example, the ISP can use an ISP setting that enhances sharpness in a region of an image depicting a person's hair, which can enhance texture clarity of the hair. Within the same image, the ISP can use a different ISP setting that reduces sharpness and enhances noise reduction in a region of the image depicting a person's skin, which can result in a processed image depicting smoother skin. Different confidence regions of the image data can identify different degrees of confidence in the classifications. The settings can further be modified based on confidence. The strength of a particular ISP parameter, such as noise reduction, sharpness, color saturation, or tone mapping, can be adjusted from a default value for a pixel based on the category of object depicted at the pixel and a confidence level of that categorization. For instance, an increase or decrease from the default value associated with a particular category of object can be tempered if the confidence level of that categorization is low, or magnified if the confidence level of that categorization is high.

In one example, an apparatus for data encoding is provided. The apparatus includes a memory and one or more processors (e.g., implemented in circuitry) coupled to the memory. The one or more processors are configured to and can: receive image data captured by an image sensor; determine that a first object image region in the image data depicts a first category of object of a plurality of categories of object; determine that a second object image region in the image data depicts a second category of object of the plurality of categories of object; identify a plurality of confidence levels corresponding to a plurality of confidence image regions of the image data, wherein each confidence level of the plurality of confidence levels identifies a confidence that a corresponding confidence image region of the plurality of confidence image regions depicts one of the plurality of categories of object; and generate an image based on the image data using an image capture process including by applying different settings for the image capture process to different portions of the image data, the different portions of the image data identified based on the first object image region, the second object image region, and the plurality of confidence image regions.

In another example, a method of image processing is provided. The method includes receiving image data captured by an image sensor. The method includes determining that a first object image region in the image data depicts a first category of object of a plurality of categories of object. The method includes determining that a second object image region in the image data depicts a second category of object of the plurality of categories of object. The method includes identifying a plurality of confidence levels corresponding to a plurality of confidence image regions of the image data, wherein each confidence level of the plurality of confidence levels identifies a confidence that a corresponding confidence image region of the plurality of confidence image regions depicts one of the plurality of categories of object. The method includes generating an image based on the image data using an image capture process including by applying different settings for the image capture process to different portions of the image data, the different portions of the image data identified based on the first object image region, the second object image region, and the plurality of confidence image regions.

In another example, an non-transitory computer readable storage medium is provided that has stored thereon instructions that, when executed by one or more processors, cause the one or more processors to: receive image data captured by an image sensor; determine that a first object image region in the image data depicts a first category of object of a plurality of categories of object; determine that a second object image region in the image data depicts a second category of object of the plurality of categories of object; identify a plurality of confidence levels corresponding to a plurality of confidence image regions of the image data, wherein each confidence level of the plurality of confidence levels identifies a confidence that a corresponding confidence image region of the plurality of confidence image regions depicts one of the plurality of categories of object; and generate an image based on the image data using an image capture process including by applying different settings for the image capture process to different portions of the image data, the different portions of the image data identified based on the first object image region, the second object image region, and the plurality of confidence image regions.

In another example, an apparatus for image processing is provided. The apparatus includes a means for receiving image data captured by an image sensor. The apparatus includes a means for determining that a first object image region in the image data depicts a first category of object of a plurality of categories of object. The apparatus includes a means for determining that a second object image region in the image data depicts a second category of object of the plurality of categories of object. The apparatus includes means for identifying a plurality of confidence levels corresponding to a plurality of confidence image regions of the image data, wherein each confidence level of the plurality of confidence levels identifies a confidence that a corresponding confidence image region of the plurality of confidence image regions depicts one of the plurality of categories of object. The apparatus includes a means for generating an image based on the image data using an image capture process including by applying different settings for the image capture process to different portions of the image data, the different portions of the image data identified based on the first object image region, the second object image region, and the plurality of confidence image regions.

In some aspects, the methods, apparatuses, and computer-readable medium described above further comprise: generating one or more modifiers, the one or more modifiers identifying at least one of a first deviation from a default setting for the image capture process for the first object image region and a second deviation from the default setting for the image capture process for the second object image region, wherein the different settings for the image capture process are based on the one or more modifiers. In some aspects, the methods, apparatuses, and computer-readable medium described above further comprise: adjusting the one or more modifiers, including blending the one or more modifiers with a blending update that is based on the plurality of confidence levels corresponding to the plurality of confidence image regions, wherein blending the one or more modifiers with the blending update adjusts at least one of the first deviation and the second deviation in at least one area of the image data.

In some aspects, the methods, apparatuses, and computer-readable medium described above further comprise: generating a category map partitioning the image data into a plurality of object image regions including the first object image region and the second object image region, wherein each object image region of the plurality of object image regions corresponds to one of the plurality of categories of object; identifying that the first category of object corresponds to a first setting for the image capture process; and identifying that the second category of object corresponds to a second setting for the image capture process. In some aspects, the methods, apparatuses, and computer-readable medium described above further comprise: generating a confidence map partitioning the image data into the plurality of confidence image regions corresponding to the plurality of confidence levels, the different portions of the image data identified based on the category map and the confidence map.

In some aspects, wherein the image capture process includes processing the image data using an image signal processor (ISP) of the one or more processors, wherein the different settings for the image capture process are different tuning settings for the ISP. In some aspects, the different tuning settings for the ISP include different strengths at which an ISP tuning parameter is applied during processing of the image data using the ISP, wherein the ISP tuning parameter is one of noise reduction, sharpening, color saturation, color mapping, color processing, and tone mapping. In some aspects, the different settings include a setting associated with at least one of a lens position, a flash, a focus, an exposure, a white balance, an aperture size, a shutter speed, an ISO, an analog gain, a digital gain, a denoising, a sharpening, a tone mapping, a color saturation, a demosaicking, a color space conversion, a shading, an edge enhancement, an image combining for high dynamic range (HDR), a special effect, an artificial noise addition, an edge-directed upscaling, an upscaling, a downscaling, and an electronic image stabilization. In some aspects, the methods, apparatuses, and computer-readable medium described above further comprise: processing the image data, including at least one of demosaicking the image data and converting the image data from a first color space to a second color space.

In some aspects, the methods, apparatuses, and computer-readable medium described above further comprise: receiving a user input associated with at least one of the first object image region and the second object image region, wherein at least one of the different settings is defined based on the user input and corresponds to one of the first object image region and the second object image region. In some aspects, applying the different settings for the image capture process to the different portions of the image data includes applying the different settings for the image capture process to the different portions of the image data using an image signal processor (ISP). In some aspects, identifying the first object image region and the second object image region include identifying the first object image region and the second object image region using a classification engine that is at least partially positioned on an integrated circuit chip. In some aspects, the methods, apparatuses, and computer-readable medium described above further comprise: displaying the image on a display.

In some aspects, the apparatus comprises a camera, a mobile device (e.g., a mobile telephone or so-called "smart phone" or other mobile device), a wireless communication device, a wearable device, an extended reality device (e.g., a virtual reality (VR) device, an augmented reality (AR) device, or a mixed reality (MR) device), a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications (e.g., associated with processing of the image), and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
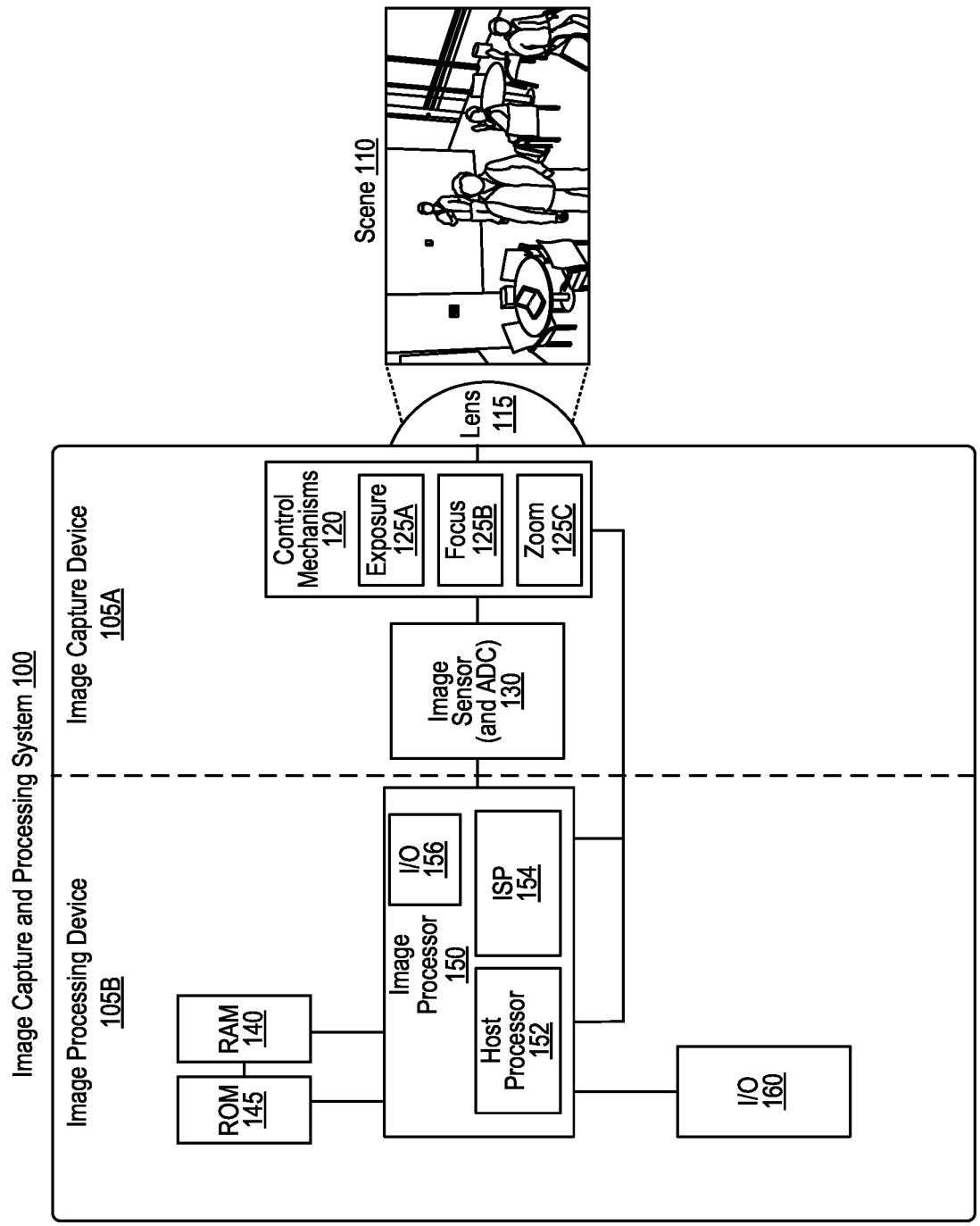
FIG. 1 is a block diagram illustrating an architecture of an image capture and processing device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," and "frame" are used interchangeably herein. An image capture device typically includes at least one lens that receives light from a scene and bends the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position.

As described in more detail below, systems and techniques are described herein for determining and applying different settings for an image capture process different image regions of image data from an image sensor. In some examples, an image capture and processing device can process image data captured by an image sensor using the different settings for the different image regions. The image data may be raw image data, or may be data partially processed by an image signal processor (ISP) or other component. For instance, raw image data or partially processed image data can be processed by an ISP using demosaicking, color space conversion, and/or another processing operation discussed herein.

In some cases, a classification engine can partition the image data into the different image regions based on detection of different types of objects within the different image regions in the image data. By applying different settings for different regions in the image data, an image is generated where capture and/or processing of image data in the image is optimized for each of the types of objects depicted in the image. In some examples, the settings may be associated with certain ISP tuning parameters of the ISP. In one illustrative example, the ISP can process the image data using an ISP setting that enhances sharpness in a region of the image data depicting a person's hair, which can enhance texture clarity of the hair in the processed image. The ISP can use a different ISP setting that reduces sharpness and enhances noise reduction in a different region of the image data that depicts a person's skin. The different ISP setting can result in the processed image depicting smooth skin while also depicting sharp and textured hair. In some examples, the settings may apply to image capture settings such as focus, exposure time, aperture size, ISO, flash, any combination thereof, and/or other image capture settings discussed herein. In some examples, the settings may apply to post-processing settings applied after the ISP has already converted the image data from raw image data from the image sensor into an image. The post-processing settings can include settings such as adjustments to brightness, contrast, saturation, tone levels, histogram, any combination thereof, and/or other processing settings discussed herein.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1110 discussed with respect to the computing device 1100. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1020, read-only memory (ROM) 145/1025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

ISPs are tuned by selecting settings for a number of ISP tuning parameters. The settings for the ISP tuning parameters can be referred to as ISP settings, ISP tuning settings, ISP tuning parameter settings, tuning settings, tuning parameter settings, or some combination thereof. The ISPs processes images using the settings selected for the ISP tuning parameters. Tuning an ISP is a computationally expensive process, and thus ISPs are traditionally only tuned once, during manufacturing, using fixed tuning techniques. The settings for the ISP tuning parameters traditionally do not change after manufacturing, and therefore are used globally across each pixel of every image processed by the ISP. To avoid situations where an image capture device cannot properly photograph certain types of scenes, the tuning of ISPs is generally selected to work reasonably well for as many types of scenes as possible. Because of this, however, the tuning of traditional ISPs is generally not optimal for photographing any type of scene. As a result, traditional ISP tuning leaves a traditional ISP as a jack of all trades, but potentially a master of none.

While ISP tuning is computationally expensive, it is possible to generate multiple settings for certain ISP tuning parameters during manufacturing. For instance, for an ISP tuning parameter such as sharpness, a high-sharpness setting may correspond to an increased sharpness level, while a low-sharpness setting may correspond to a decreased sharpness level. The different settings may be useful when an image is being captured primarily depicts a single type of object, such as a close-up image of a plant, a person's face, a vehicle, or food. For an image of a person's face, the low-sharpness setting can be selected, either through a user interface or automatically based on detection of the face in a preview image, in order to depict smoother facial skin. For an image of a plant, the high-sharpness setting can be selected, either through a user interface or automatically based on detection of the plant in a preview image, in order to depict more detail in the textures of the leaves and flowers of the plant. However, images that depict only one type of object are rare, since most images depict many types of objects. For images depicting multiple types of objects, use of adjusted settings may produce unwanted effects. For example, if an image depicts both a face and a plant, use of a high-sharpness setting may cause facial skin to appear uneven, while use of a low-sharpness setting may cause the leaves and flowers of the plant to appear to blend together. To avoid such unwanted effects, such adjusted settings are likely to be used very sparingly in ISPs that apply tuning settings globally to all pixels.

Figure 2:
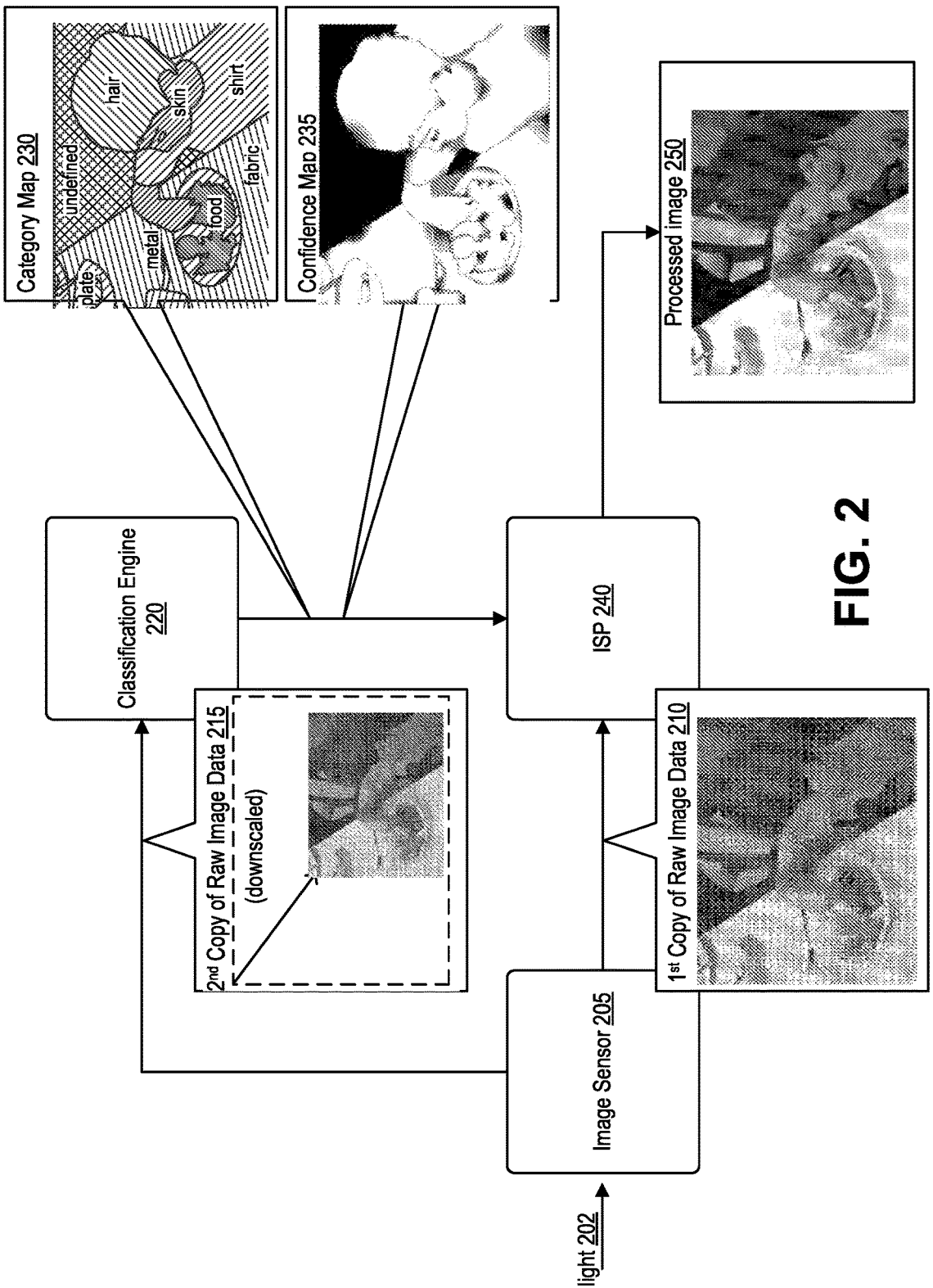
FIG. 2 is a conceptual diagram illustrating image processing using a category map and a confidence map.

FIG. 2 is a conceptual diagram 200 illustrating image processing using a category map 230 and a confidence map 235. The diagram 200 shows three hardware components of an image capture and processing device 100, namely an image sensor 205, an ISP 240, and a classification engine 220. The image sensor 205 may be an example of the image sensor 130 of FIG. 1. The ISP 240 may be an example of the ISP 154 of FIG. 1. The classification engine 220 may be an example of the host processor 152 of FIG. 1, the ISP 154 of FIG. 1, the image processor 150 of FIG. 1, a central processing unit (CPU), a graphics processing unit (GPU), an accelerated processing unit (APU), another type of processor 1510, or some combination thereof.

The image sensor 205 receives light 202 from a scene that is being photographed by the image capture and processing device 100. The scene being photographed in the diagram 200 is a scene in which a child is eating food from a plate set on a table. The image sensor 205 captures raw image data 210 based on the light 202 from the scene. The raw image data 210 are the signals from the photodiodes of the photodiode array of the image sensor 205, in some cases amplified via an analog gain amplifier and in some cases converted from an analog format to a digital format using an analog to digital converter (ADC). The raw image data 210 generally includes separate image data from different photodiodes with different color filters. For instance, if the image sensor 205 uses Bayer color filters, the raw image data 210 includes image data corresponding to red-filtered photodiodes, image data corresponding to green-filtered photodiodes, and image data corresponding to blue-filtered photodiodes.

The image sensor 205 sends a first copy of the raw image data 210 to the ISP 240. The image sensor 205 sends a second copy of the raw image data 215 to the classification engine 220. In some cases, second copy of the raw image data 215 can be downscaled, for example by a 1:2 ratio, by a 1:4 ratio, by a 1:8 ratio, by a 1:16 ratio, by a 1:32 ratio, by a 1:64 ratio, by another ratio higher than 1:64, or by another ratio in between any of the previously-listed ratios. While the second copy of the raw image data 215 is illustrated in the diagram 200 as already being downscaled for simplicity, it should be understood that the second copy of the raw image data 215 can be downscaled by the classification engine 220 upon receipt of the second copy of the raw image data 215. In some cases, the second copy of the raw image data 215 can be downscaled before the second copy of the raw image data 215 is sent to and/or received by the classification engine 220. For instance, the second copy of the raw image data 215 can be downscaled at the image sensor 205, at the ISP 240, at a downscaler component (not pictured) that is separate from the image sensor 205 and the ISP 240, or some combination thereof. The downscaling technique(s) used to downscale the second copy of the raw image data 215 may include nearest neighbor downscaling, bilinear interpolation, bicubic interpolation, Sinc resampling, Lanczos resampling, box sampling, mipmapping, Fourier-transform scaling, edge-directed interpolation, high quality scaling (hqx), or some combination thereof. In some cases, the second copy of the raw image data 215 may be at least partially processed by the ISP 240 and/or one or more additional components before the second copy of the raw image data 215 is sent to and/or received by the classification engine 220. For example, the second copy of the raw image data 215 may be demoisaicked by the ISP 240 before the second copy of the raw image data 215 is received by the classification engine 220. The second copy of the raw image data 215 may be converted from one color space (e.g., the RGB color space) into another color space (e.g., the YUV color space) before the second copy of the raw image data 215 is received by the classification engine 220. This processing can be performed before or after the downscaling of the second copy of the raw image data 215.

In some examples, the classification engine 220 receives the downscaled second copy of the raw image data 215. In some examples, the classification engine 220 receives the second copy of the raw image data 215 and performs downscaling to generate the downscaled second copy of the raw image data 215. The classification engine 220 can generate a category map 230 and a confidence map 235 using the downscaled second copy of the raw image data 215. For example, the classification engine 220 can partition the downscaled second copy of the raw image data 215 into different image regions based on detection of different categories of objects within the different image regions in the downscaled second copy of the raw image data 215. As an illustrative example, the category map 230 illustrated in the diagram 200 includes two image regions corresponding to the child's face and arm that are shaded in a first (diagonally striped) shading pattern and labeled "skin,"

signifying that the classification engine 220 detects skin in those image regions. Similarly, the category map 230 illustrated in the diagram 200 includes an image region corresponding to the hair on the child's head that are shaded in a second (diagonally striped) shading pattern and labeled "hair," signifying that the classification engine 220 detects hair in that image region. In some cases, regions with eyelashes, eyebrows, beards, mustaches, and/or other hair objects can also be identified by the classification engine 220 as hair. Other image regions illustrated in the category map 230 include an image region shaded in a third (diagonally striped) shading pattern and labeled "shirt" in which the classification engine 220 detects a shirt, several image regions colored shaded in a fourth (diagonally striped) shading pattern and labeled "food" in which the classification engine 220 detects food, two image regions colored shaded in a fifth (diagonally striped) shading pattern and labeled "fabric" in which the classification engine 220 detects fabric, three image regions shaded in a sixth (diagonally striped) shading pattern and labeled "metal" in which the classification engine 220 detects metal, and two image regions shaded in a seventh (cross-hatched) shading pattern and labeled "undefined" in which the classification engine 220 is uncertain what is depicted. Image regions that the classification engine 220 classifies as depicting different categories of objects may depict different objects, different types of objects, different materials, different substances, different elements, different components, objects with different attributes, or some combination thereof. The different shading patterns in the category map 230 of FIG. 2 may represent different values stored at the corresponding pixel locations in the category map 230, such as different colors, different sshades of grey, different numbers, different characters, or different sequences of bits. In some cases, an image region that is determined to depict a particular category of object may be referred to as image regions, object image regions, image object regions, category image regions, image category regions, category regions, object category regions, object category image regions, image object category regions, or a combination thereof. For instance, an image region that is determined to depict a first category of object may be referred to as a first object image region, an image region that is determined to depict a second category of object may be referred to as a second object image region, and so forth.

The confidence map 235 identifies a degree of confidence that the classification engine 220 has as to its classification of a given pixel in the category map 230. A region of the image data with a particular confidence level may be referred to as a confidence region, a confidence image region, an image region, a region, a portion, or a combination thereof. Pixels illustrated in white in the confidence map 235 represent a high confidence level, such as a confidence level exceeding a high threshold percentage, such as 90%. Pixels illustrated in black in the confidence map 235 represent a low confidence level, such as a confidence level falling below a low threshold percentage, such as 10%. The confidence map 235 also includes six different shades of grey (other than black and white), each representing confidence levels falling into different ranges of confidence between the high threshold percentage and the low threshold percentage. For instance, the lightest shade of grey (that is still darker than white) may represent confidence values falling between 90% and 80%, the next shade of grey that is one shade darker than the previous listed shade of grey may represent confidence values falling between 80% and 70%, the next shade of grey that is one shade darker than the previous listed shade of grey may represent confidence values falling between 70% and 60%, and so on. Including black, white, and the six shades of grey in between black and white, the example confidence map 235 includes eight shades of grey in total, which correspond to eight possible confidence levels. In some examples, the confidence level for a particular pixel may be stored as a 3-bit value. The classification engine 220 sends the category map 230 and the confidence map 235 to the ISP 240. The confidence map 235 may visually appear to have visible banding between different shades of grey, for instance where a gradient between shades is present. In some examples, the shades of grey may map to confidence levels in the opposite direction to that described above, so that black and darker shades of grey represent higher confidence values, while white and lighter shades of grey represent lower confidence values.

In some cases, the category map 230 and the confidence map 235 can be a single file, data stream, and/or set of metadata. Any discussion herein of either one of the category map 230 or the confidence map 235 should be understood to potentially include both the category map 230 or the confidence map 235. In one example, the single file can be an image. For instance, each pixel of the image can include one or more values that corresponds to a categorization and confidence associated with a corresponding pixel of the second copy of the raw image data 215. In another example, the single file can be a matrix or table, with each cell of the matrix or table storing the value that corresponds to a categorization and confidence associated with a corresponding pixel of the second copy of the raw image data 215. For a given pixel of the second copy of the raw image data 215, the file stores a value in a corresponding cell or pixel. In some examples, a first plurality of bits in the stored value represent a category of object that the classification engine 220 classifies the pixel as depicting. In such examples, a second plurality of bits in the stored value can represent the confidence of the classification engine 220 in classifying the pixel as depicting the category of object.

In one illustrative example, a stored value in the file may be 8 bits in length, which may be referred to as a byte or as an octet. The first plurality of bits identifying the category of object may be 5 bits of the 8 bit value, such as the earliest or most-significant 5 bits of the 8 bit value. With 5 bits, the first plurality of bits can identify 32 possible categories of object. The first plurality of bits may represent the most significant bits (MSB) of the stored value. In the above illustrative example, the second plurality of bits representing the confidence may be 3 bits of the 8 bit value, such as the last or least-significant 3 bits of the 8 bit value. With 3 bits, the second plurality of bits can identify 8 possible confidence values. The second plurality of bits may represent the least significant bits (LSB) of the stored value. In some cases, the first plurality of bits may be later than the second plurality of bits within the value. In some cases, different breakdowns in bit length divisions are possible. For instance, the first plurality of bits and the second plurality of bits can include 4 bits each. The first plurality of bits can include 1 bit, 2 bits, 3 bits, 4 bits, 5 bits, 6 bits, 7 bits, or 8 bits. The second plurality of bits can include 1 bit, 2 bits, 3 bits, 4 bits, 5 bits, 6 bits, 7 bits, or 8 bits. In some examples, a stored value in the file may be fewer or greater than 8 bits in length.

In some examples, as noted above, the confidence map 235 and the category map 230 are a single file storing two separate values per pixel of the second copy of the raw image data 215, where one of the values represents the category of object and the other one of the values represents the confidence. In some examples, the confidence map 235 and the category map 230 are separate files, with one of the files storing values representing the category of object and the other one of the files storing values representing confidence.

In some cases, the classification engine 220 upscales the category map 230 and the confidence map 235 from the size of the downscaled second copy of the raw image data 215 to the size of the first copy of the raw image data 215 and/or to the size of the processed image 250. This upscaling process may use nearest neighbor (NN) upscaling or specialized category map upscaling (CMUS), also referred to as NN upscaling modified with spatial weight filtering as illustrated in and discussed with respect to at least FIG. 9, FIG. 10, and FIG. 11. In some cases, the classification engine 220 blends or merges the category map 230 and the confidence map 235 into a single file before transmitting the single file to the ISP 240.

The ISP 240 receives the first copy of the raw image data 210 from the image sensor 205, and receives the category map 230 and the confidence map 235 from the classification engine 220. In some cases, the ISP 240 can perform certain early processing tasks on the first copy of the raw image data 210 while the classification engine 220 is generating the category map 230 and the confidence map 235, and/or before the ISP 240 receives the category map 230 and the confidence map 235 from the classification engine 220. These early image processing tasks may include, for example, demosaicing, color space conversion (e.g., from RGB to YUV), pixel interpolation, and/or downsampling. In other cases, however, the ISP 240 may delay some or all of these early image processing tasks until the ISP 240 receives the category map 230 and the confidence map 235 from the classification engine 220.

Once the ISP 240 receives the category map 230 and the confidence map 235 from the classification engine 220, the ISP 240 uses the category map 230 and the confidence map 235 from the classification engine 220 to process the image. The ISP 240 includes multiple modules controlling application of the different ISP tuning parameters, which the ISP 240 can set to different settings. In one example, the ISP tuning parameters include noise reduction (NR), sharpening, tone mapping (TM), and color saturation (CS). In some cases, the ISP tuning parameters can also include additional parameters, such as gamma, gain, luminance, shading, edge enhancement, color correction (CC), color mapping (CM) (e.g., based on a 2D look-up table and/or 3D look-up table), color shift, color enhancement, image combining for high dynamic range (HDR), special effects processing (e.g., background replacement, bokeh effect), artificial noise (e.g., grain) adder, demosaicking, edge-directed upscaling, other processing parameters discussed herein, or combinations thereof. The different settings for each ISP module can include a default setting (also referred to as a default ISP tuning setting), one or more settings that increase application the ISP tuning parameter relative to the default setting, and one or more settings that decrease application the ISP tuning parameter relative to the default. For instance, for the noise reduction (NR) ISP tuning parameter, available settings can include a default level of noise reduction, one or more increased levels of noise reduction that perform more noise reduction than the default level, and one or more decreased levels of noise reduction that perform less noise reduction than the default level. In some cases, one or more of the different ISP tuning parameters can include sub-parameters. A setting for such an ISP tuning parameter can include values or modifiers for one or more of these sub-parameters. For instance, the NR ISP tuning parameter can include sub-parameters including luma NR strength, chroma NR strength, temporal filter (e.g., for video or sequence denoising). A setting for NR can include modifiers for the luma NR strength sub-parameter, the chroma NR strength sub-parameter, and/or the temporal filter sub-parameter. In some examples, the color saturation (CS) module 350 can control color correction (CC) and/or color mapping (CM) and/or color shift and/or color enhancement instead of, or in addition to, color saturation (CS). The color saturation (CS) module 350 can be referred to as the module for any of the above-listed parameters (e.g., CC module, CM module, color shift module, color enhancement module). The color saturation (CS) module 350 can in some cases be referred to as the color processing module. In some examples, the ISP pipeline 305 may include a separate color correction (CC) and/or color mapping (CM) and/or color shift and/or color enhancement modules. In some examples, noise reduction (NR) includes spatial noise reduction, temporal noise reduction, or both. While the NR module 320 is illustrated as a single module in FIG. 3, in some examples the ISP pipeline 305 may include a separate spatial noise reduction module and a separate temporal noise reduction module.

When the ISP 240 is processing the first copy of the raw image data 210, the ISP 240 processes each image region of the first copy of the raw image data 210 differently based on which category of object is depicted in that image region according to the category map 230. In particular, if a first image region is identified as depicting skin by the category map 230, then the ISP 240 processes that first image region according to settings corresponding to skin. The settings corresponding to skin can be stored as a particular modification (corresponding to skin) to a default strength level for how strongly a particular parameter is applied. If a second image region is identified as depicting hair by the category map 230, then the ISP 240 processes that second image region using settings corresponding to hair. The settings corresponding to hair can be stored as a particular deviation (corresponding to hair) to a default strength level for how strongly a particular parameter is applied. The ISP 240 may identify the settings to use from a look-up table, database, or other data structure that maps object category identifiers in the category map 230 to corresponding settings.

In some cases, the ISP 240 can process different pixels within an image region differently based on the confidence level associated with each pixel in the confidence map 235. The ISP 240 can use a combination of the category map 230 and the confidence map 235 to do so. For instance, the map decoder components of the ISP 240 illustrated in and discussed with respect to FIG. 3 can generate modifiers using the category map 230 and the confidence map 235 as illustrated and discussed with respect to FIG. 4. Similarly, in some cases, the smooth transition map processor 365 illustrated in and discussed with respect to FIG. 3 can generate modifiers using the category map 230 and the confidence map 235 as illustrated and discussed with respect to FIG. 7. The ISP 240 can apply a specific ISP tuning parameter, such as noise reduction, sharpening, tone mapping, and/or color saturation, to the image data based on the modifiers. In particular, the setting with which the ISP 240 applies the specific ISP tuning parameter to a given pixel of the image data depends on application of the modifier as illustrated in and discussed with respect to FIG. 4, FIG. 5A, FIG. 5B, and FIG. 5C. Effectively, the modifier controls the strength or weight with which the ISP 240 applies the specific ISP tuning parameter to a given pixel of the image data based on the modifier.

Eventually, the ISP 240 generates the processed image 250 by processing different image regions of the first copy of the raw image data 210 using the different modules set to different settings per image region based on the category map 230 and/or based on the confidence map 235. As noted previously, the settings corresponding to an object image region can be stored as a particular deviation (corresponding to the category of object) to a default strength level for how strongly a particular parameter is applied. While not illustrated in the diagram 200, the ISP 240 may send the processed image 250 to a storage device, for instance using the I/O 156 and/or the I/O 160. The storage device may include an image buffer, random access memory (RAM) 140/1525, read only memory (ROM) 145/1520, a cache 1512, a storage device 1530, a secure digital (SD) card, a mini SD card, a micro SD card, a smartcard, an integrated circuit (IC) memory card, a compact disc, a portable storage medium, a hard drive (HDD), a solid state drive (SSD), a flash memory drive, a non-transitory computer readable storage medium, any other type of memory or storage device discussed herein, or some combination thereof. While not illustrated in the diagram 200, the ISP 240 may send the processed image 250 to a display buffer and/or to a display screen or projector, so that the image is rendered and displayed on the display screen and/or using the projector.

In some cases, either or both of the first copy of the raw image data 210 and the second copy of the raw image data 215 can be referred to simply as the raw image data, or as the image data. The image sensor 205 can sends out the first copy of the raw image data 210 and the second copy of the raw image data 215 to the ISP 240 and/or to the classification engine 220 as illustrated in FIG. 2. Alternately, the image sensor 205 can simply send out a single copy of the raw image data to a recipient component, which may be the ISP 240 and/or the classification engine 220 and/or another image processing component not illustrated in FIG. 2. This recipient component can generate one or more copies of the raw image data, one or more of which the recipient component sends out as first copy of the raw image data 210 and/or the second copy of the raw image data 215 to the ISP 240 and/or to the classification engine 220. The recipient component can use and/or send out the original copy of the raw image data 210 that it receives from the image sensor as the first copy of the raw image data 210 and/or the second copy of the raw image data 215.

In some cases, different image capture settings can also be generated for different image regions of the image data, for instance including settings for focus, exposure time, aperture size, ISO, flash, any combination thereof, and/or other image capture settings discussed herein. In some examples, one or more of these image capture settings can be determined at the ISP 240. In some examples, one or more of these image capture settings can be sent back to the image sensor 205 for application to the image data. In some cases, different image frames may be captured by the image sensor 205 using the different image capture settings, and then merged together by the ISP 240, a host processor 152, an image processor 150, another image processing component, or some combination thereof, so that different image regions are taken from image frames captured using different image capture settings. In some examples, different post-processing settings can also be generated for different image regions of the image, for instance including settings for brightness, contrast, saturation, tone levels, histogram, any combination thereof, and/or other processing settings discussed herein. In some cases, applying settings at the ISP 240 can allow for greater control over the resulting processed image, and greater quality in applied processing effects (e.g., as compared to post-processing settings). This is due to the ISP 240 receiving raw image data from the image sensor 205 as its input, while post-processing is typically applied over an image 250 that is already generated by the ISP 240.

In some cases, at least one of the different settings for the different categories of object—e.g., ISP tuning settings, image capture settings, and/or post-processing settings—can be manually set by a user using a user interface. For example, a user interface can receive input(s) from a user specifying settings indicating that a heightened sharpening setting should always be applied to image regions that depict text. Similarly, a user interface can receive input(s) from a user specifying settings indicating that a reduced sharpening setting and an increased noise reduction setting should always be applied to image regions that depict faces, so that the skin on the faces appears smoother. In some cases, at least one of the different settings for the different categories of object can be automatically set by the ISP 240, the classification engine 220, a host processor 152, an image processor 150, an application (e.g., an application used for post-processing of an image), another image processing component, or some combination thereof. In some cases, at least one of the different settings for the different categories of object can be automatically set based on settings that were manually set, for instance by automatically determining a setting that deviates from manually set setting based on a modifier, such as a multiplier, an offset, or a logic-based modifier. The deviation from the modifier may be predetermined or automatically determined, for instance based on how different one category of object is determined to be from another category of object with respect to a certain visual trait, such as texture or color. For example, the ISP 240 may determine that similar or identical settings should be applied to image regions depicting line art as to image regions depicting text. The ISP 240 may determine that settings applied to image regions depicting skin with hair stubble should be approximately halfway between settings applied to image regions depicting skin and settings applied to image regions depicting longer hair. The ISP 240 may determine that settings applied to image regions depicting stucco walls should be similar to settings applied to image regions depicting brick walls, but with noise reduction increased by 10%.

Figure 3:
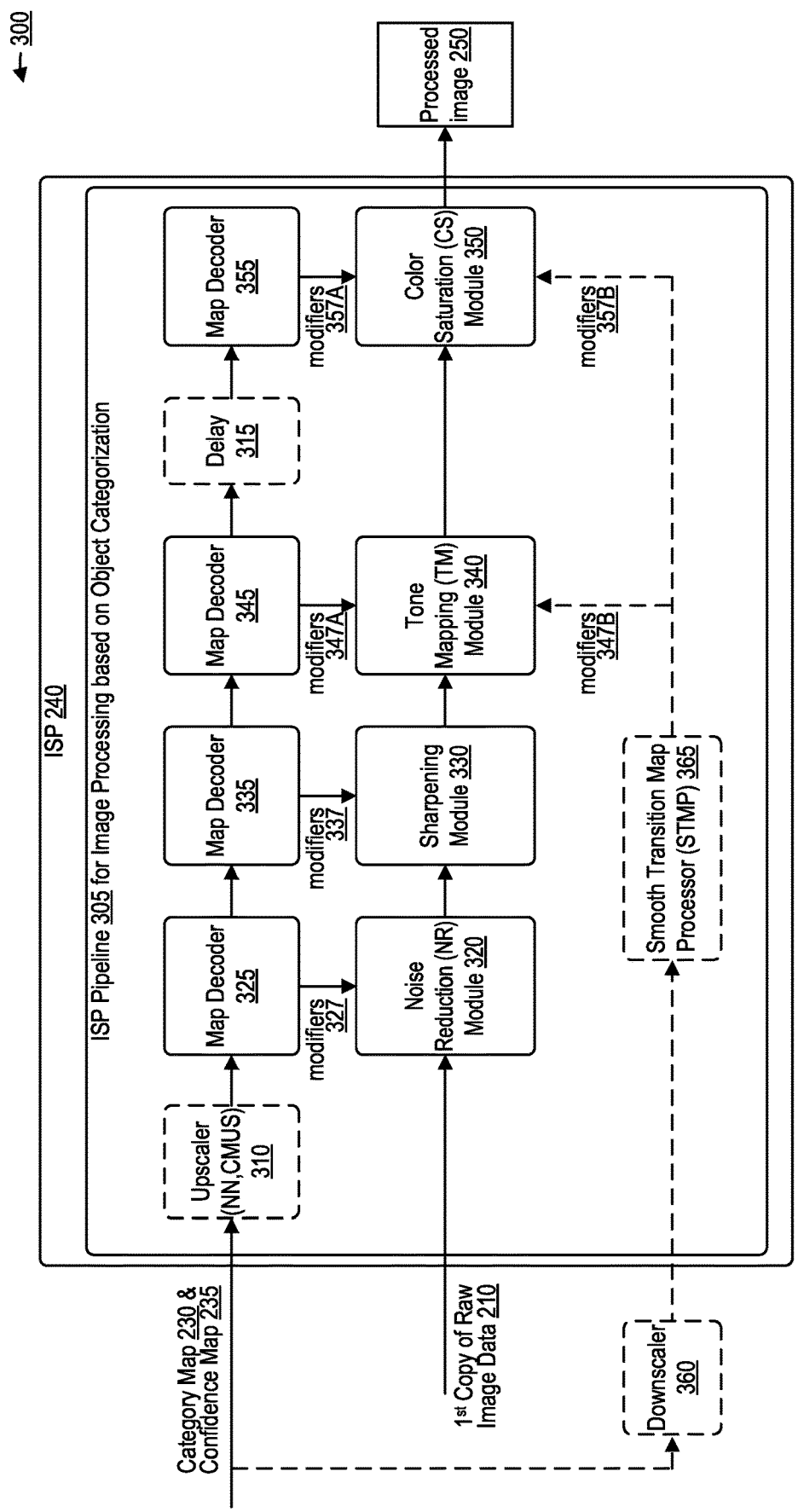
FIG. 3 is a conceptual diagram illustrating an image signal processor (ISP) pipeline for image processing based on object categorization.

FIG. 3 is a conceptual diagram 300 illustrating an ISP pipeline 305 for image processing based on object categorization. The ISP pipeline 305 illustrates operations performed by components of the ISP 240. The operations and components of the ISP pipeline 305 are laid out in an exemplary arrangement and order as in a flow diagram.

Inputs to the ISP pipeline 305, and therefore to the ISP 240, are illustrated on the left side of the ISP pipeline 305. The inputs to the ISP pipeline 305 include the category map 230, the confidence map 235, and the first copy of the image data 210. The first copy of the image data 210 may be in the color filter domain (e.g., Bayer domain), the RGB domain, the YUV domain, or another color domain discussed herein. While demosaicing and color domain transformations are not illustrated within the diagram 300, it should be understood that demosaicing and/or color domain transformations may be performed by the ISP 240, before the operations illustrated in the diagram 200, after the operations illustrated in the diagram 200, and/or between any two of the operations illustrated in the diagram 200. The category map 230 and the confidence map 235 are illustrated being received twice by different elements of the ISP pipeline 305. However, it should be understood that the ISP 240 may receive the category map 230 and the confidence map 235 once, and internally distribute the category map 230 and the confidence map 235 to all appropriate components and elements of the ISP 240.

The ISP pipeline 305 receives the category map 230 and the confidence map 235 from the classification engine 220 and passes it through multiple map decoders 325, 335, 345, and 355 that each correspond to different modules. Before passing the category map 230 and the confidence map 235 to the map decoders 325, 335, 345, and 355, the ISP pipeline 305 can upscale the category map 230 and the confidence map 235 using upscaler 310, for instance using nearest neighbor (NN) upscaling and/or specialized category map upscaling (CMUS). The upscaler 310 can upscale the category map 230 and the confidence map 235 so that the dimensions of the category map 230 and the confidence map 235 match the dimensions of the first copy of the raw image data 210 and/or the dimensions of the processed image 250. In some cases, at least some of the upscaling discussed with respect to the upscaler 310 can occur at the classification engine 220 before the ISP 240 receives the category map 230 and the confidence map 235. In some cases, the category map 230 and the confidence map 235 can be upscaled once at the classification engine 220 and another time at the upscaler 310 of the ISP 240.

Whether or not the ISP pipeline 305 uses the upscaler 310 to upscale the category map 230 and the confidence map 235, the ISP 240 receives and passes the category map 230 and the confidence map 235 to the map decoder 325 corresponding to the noise reduction (NR) module 320. Based on the category map 230 and the confidence map 235, the map decoder 325 generates one or more modifiers 327. The NR module 320 can use the one or more modifiers 237 to determine settings for NR to apply to different pixels of the first copy of the raw image data 210. The NR module 320 generates NR-processed image data by processing the first copy of the raw image data 210 based on the modifiers 327. The NR module 320 can send the NR-processed image data to the sharpening module 330. In some examples, NR includes spatial noise reduction, temporal noise reduction, or both. While the NR module 320 is illustrated as a single module in FIG. 3, in some examples the ISP pipeline 305 may include a separate spatial noise reduction module and a separate temporal noise reduction module.

The map decoder 325 passes the category map 230 and the confidence map 235 on to the map decoder 335 corresponding to the sharpening module 330. Based on the category map 230 and the confidence map 235, the map decoder 335 generates one or more modifiers 337. The sharpening module 330 can use the one or more modifiers 337 to determine settings for sharpening to apply to different pixels of the NR-processed image data from the NR module 320. The sharpening module 330 generates sharpening-processed image data by processing the NR-processed image data based on the modifiers 337, and sends the sharpening-processed image data to the tone mapping (TM) module 340.

The map decoder 335 passes the category map 230 and the confidence map 235 on to the map decoder 345 corresponding to the TM module 340. Based on the category map 230 and the confidence map 235, the map decoder 345 generates one or more modifiers 347A, which the TM module 340 uses to determine settings for (TM) to apply to different pixels of the sharpening-processed image data from the sharpening module 330. The TM module 340 generates (TM)-processed image data by processing the sharpening-processed image data based on the modifiers 347A, and sends the sharpening-processed image data to the color saturation (CS) module 350.

The map decoder 345 passes the category map 230 and the confidence map 235 on to the map decoder 355 corresponding to the CS module 350. In some cases, a delay 315 is applied between the map decoder 345 and the map decoder 355. Based on the category map 230 and the confidence map 235, the map decoder 355 generates one or more modifiers 357A, which the CS module 350 uses to determine settings for CS to apply to different pixels of the TM-processed image data from the TM module 340. The CS module 350 generates CS-processed image data by processing the TM-processed image data based on the modifiers 357A. In some examples, the delay 315 can serve to synchronize the receipt of the modifiers 357A at the CS module 350 from the map decoder 355 to the receipt of the TM-processed image data at the CS module 350. Similar delays can be inserted between any two elements of an image capture and processing device 100 (including of the ISP 240) to help synchronize transmission and/or receipt of other signals internal to the image capture and processing device 100. In some cases, the CS-processed image data is then output by the ISP 240 as the processed image 250. In some cases, the ISP 240 performs one or more additional image processing operations to the CS-processed image data to generate the processed image 250. These one or more additional image processing operations may include, for instance, downscaling, upscaling, gamma adjustment, gain adjustment, another image processing operation discussed herein, or some combination thereof. In some cases, image processing using one of the ISP tuning parameter modules 320, 330, 340, or 350 may be skipped. In some examples, the map decoder 325, 335, 345, or 355 corresponding to the skipped ISP tuning parameter module may be skipped. If one or both of these are skipped, a delay similar to the delay 315 may be added in place of the skipped module (the ISP parameter module and/or the corresponding map decoder) to ensure that processing elements remain synchronized moving forward. In some cases, the map decoders 325, 335, 345, and/or 355 may keep track of timing internally and be able to detect when a module is skipped or removed, and can dynamically adjust timing with which modifiers are generated and/or sent to corresponding ISP tuning parameter modules 320, 330, 340, or 350.

The delay 315 is a module that is agnostic to the category map 230 and the confidence map 235, in that it receives the category map 230 and the confidence map 235 from the map decoder 345 and sends the category map 230 and the confidence map 235 on to the next map decoder 355 without generating any modifiers using the category map 230 and/or the confidence map 235. In some cases, other components can be included (but not illustrated) within the ISP pipeline 305 that are agnostic to the category map 230 and/or the confidence map 235. In some cases, the delay 315 can be removed. In some cases, one or more delay modules similar to the delay 315 can be inserted between any two other components of the ISP pipeline 305, the ISP 240, any map decoder, the smooth transition map processor (STMP) 365, the classification engine 220, the image capture and processing device 100, the computing system 1500, any component of any of these modules, any other component or module or device discussed herein, or a combination thereof.

In some cases, the ISP 240 can pass the category map 230 and confidence map 235 to a smooth transition map processor (STMP) 365. The ISP 240 can use the STMP 365 to generate modifiers and pass those modifiers to at least some of the modules 320, 330, 340, and 355 instead of or in addition to at least some of the map decoders 325, 335, 345, and 355. The STMP 365 can be used to create smooth transitions between as illustrated in and discussed with respect to at least FIG. 6, FIG. 7, and FIG. 8. In some examples, a downscaler 360 downscales the category map 230 and confidence map 235 before the STMP 365 receives the category map 230 and confidence map 235. In the conceptual diagram 300, the downscaler 360 is illustrated as a component that is not part of the ISP 240; thus, the ISP 240 may receive the category map 230 and confidence map 235 from the classification engine 220 as well as a downscaled version of the category map 230 and confidence map 235 from the downscaler 360. The downscaler 360 can receive the confidence map 235 from the classification engine 220 from the classification engine. In some examples, the downscaler 360 can be part of the ISP 240, so that the ISP 240 receives the category map 230 and confidence map 235 and routes the category map 230 and confidence map 235 to the downscaler 360 itself before passing the downscaled category map 230 and confidence map 235 to the STMP 365.

In the diagram 300, the STMP 365 is illustrated generating alternate modifiers 347B for the TM module 340, and passing the alternate modifiers 347B to the TM module 340 for the TM module 340 to use in processing the sharpening-processed image data. The STMP 365 is illustrated generating alternate modifiers 357B for the CS module 350, and passing the alternate modifiers 357B to the CS module 350 for the CS module 350 to use in processing the TM-processed image data. While not illustrated in the diagram 300, the STMP 365 may also generate modifiers for, and pass the generated modifiers to, the NR module 320 and/or the sharpening module 325.

The diagram 300 illustrates the category map 230 and the confidence map 235 being passed in series between the map decoders 325, 335, 345, and 355, from one to the next. Instead, however, the ISP 240 may pass copies of the category map 230 and the confidence map 235 to two or more of the map decoders 325, 335, 345, and 355 in parallel. This way, the map decoders 325, 335, 345, and 355 may generate the modifiers 327, 337, 347A, and 357A in parallel, potentially increasing image processing efficiency.

While the STMP 365 and the upscaler 310 are illustrated as components of the ISP pipeline 305 and the ISP 240, at least one of these may in some examples be separate from the ISP pipeline 305 and/or the ISP 240. For instance, at least one of the STMP 365 and/or the upscaler 310 may be part of the classification engine 220, another component of an image capture and processing device 100, another component of a computing system 1500, or some combination thereof. While the downscaler 360 is illustrated as a component separate from the ISP pipeline 305 and the ISP 240, in some examples the downscaler 360 may be part of the ISP pipeline 305 and/or the ISP 240.

For the purposes of illustration, different ISP parameter modules are illustrated in, and described in, a particular order. It should be appreciated that in alternate embodiments, the ISP parameter modules may be arranged in a different order than that described, and/or that the operations performed by the ISP parameter modules may be performed in a different order than that described. For example, the TM module 340 may be positioned before the sharpening module 330 and/or before the NR module 320.

Figure 4:
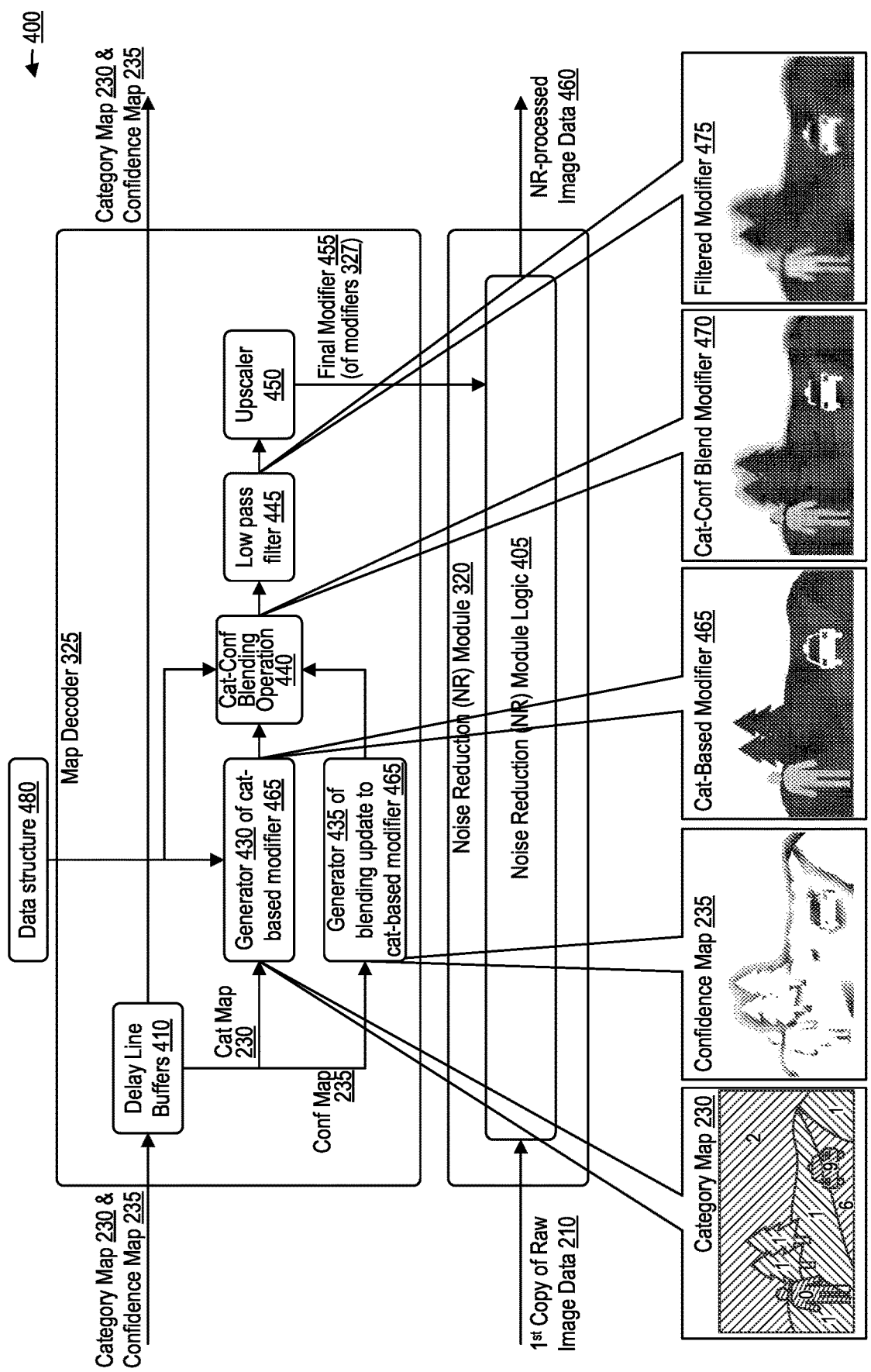
FIG. 4 is a conceptual diagram illustrating a map decoder pipeline.

FIG. 4 is a conceptual diagram 400 illustrating a map decoder 325 pipeline. The conceptual diagram 400 includes operations performed by components of the map decoder 325 of the ISP 240. The map decoder 325 corresponds to the NR module 320, and the diagram 400 illustrates generation of a modifier 455 of the modifiers 327, and transmission of the modifier 455 to the NR module 320. The operations and components of the map decoder 325 are laid out in an exemplary arrangement and order as in a flow diagram.

The map decoder 325 receives the category map 230 and the confidence map 235 generated by the classification engine 220 and received by the ISP 240. In some examples, the map decoder 325 can include a delay line buffer 410. The delay line buffer 410 can delay the sending of the category map 230 and the confidence map 235 on from the map decoder 325 to the map decoder 335 corresponding to the sharpening module 330 that is next in line in the ISP pipeline 305. The delay line buffer 410 can also delay transmission of the modifiers 327 (including the modifier 455) to the NR module 320 so that the timing of receipt of the modifiers 327 by the NR module 320 is synchronized with the timing of receipt of the first copy of the raw image data 210 by the NR module 320.

As shown in FIG. 4, a generator 430 of a category-based modifier 465 obtains the category map 230 (e.g., from a buffer of the delay line buffers 410 or directly). An example category map 230 is illustrated at the bottom of the conceptual diagram 400 labelling each of several differently-colored image regions with different numerical values that each correspond to one of several categories of object. In particular, the category map 230 of the conceptual diagram 400 includes a first image region shaded in a first shading pattern and labeled with a "0," representing a human being as a category of object. The category map 230 of FIG. 4 includes several secondary image regions depicting trees and grass, all shaded in a second shading pattern and labeled with a "1," representing plants as a category of object. A third image region in the category map 230 is shaded in a third shading pattern and labeled with a "2," representing sky as a category of object. A fourth image region in the category map 230 is shaded in a fourth shading pattern and labeled with a "6," representing an asphalt road as a category of object. Finally, a fifth image region in the category map 230 is shaded in a fifth shading pattern and labeled with a "9," representing a vehicle as a category of object. The different shading patterns in the category map 230 of FIG. 4 may represent different values stored at the corresponding pixel locations in the category map 230, such as different colors, different shades of grey, different numbers, different characters, or different sequences of bits.

To generate the category-based modifier 465, the generator 430 cross-references the categories of object in the different image regions of the category map 230 against a data structure 480. The data structure 480 may be, for example, a look-up table, a database, a dictionary, a list, an array, an array list, a different data structure that can store associations between values, or some combination thereof. The data structure 480 stores predetermined settings appropriate for each of the categories of object and for the ISP tuning parameter in question. Since the map decoder 325 corresponds to the NR module 320, the data structure 480 stores predetermined settings appropriate for each of the categories of object and for NR. The different predetermined settings can essentially represent different strengths with which to apply NR. In some examples, the different predetermined settings are expressed in as values according to an absolute scale. In some examples, the different predetermined settings are expressed in as values relative to other values, for instance relative to values in a default setting.

An example category-based modifier 465 produced by the generator 430 is illustrated at the bottom of the conceptual diagram 400. The example category-based modifier 465 is illustrated in greyscale, with lighter shades representing predetermined settings associated with higher levels of NR, and darker shades representing predetermined settings associated with lower levels of NR. In total, 4 distinct shades of grey are used, based on the category map 230. Thus, the image regions categorized in the category map 230 as depicting the sky (2) and the vehicle (9) both are to be processed with a high level of NR, the image region categorized in the category map 230 as depicting the human being (0) is to be processed with a medium level of NR, the image region categorized in the category map 230 as depicting the asphalt road (6) is to be processed with a low level of NR, and the image regions categorized in the category map 230 as depicting the plants (1) is to be processed with the lowest level of NR.

Within the map decoder 325, the confidence map 235 is sent to a generator 435 of a blending update to the category-based modifier 465. An example confidence map 235 is illustrated at the bottom of the conceptual diagram 400. The confidence map 235 is illustrated in 8 shades of greyscale as discussed previously, with lighter shades representing higher levels or degrees of confidence, and darker shades representing lower levels or degrees of confidence. The confidence map 235 of FIG. 4 may visually appear to have visible banding between different shades of grey, for instance where a gradient between shades is present. The confidence map 235 indicates that the classification engine 220 generated the category map 230 with a generally high level of confidence, with most of the portions having lower confidence levels being around edges between different image regions representing different categories of objects. The generator 435 may identify appropriate adjustments to the predetermined settings in the category-based modifier 465 based on different confidence levels. These adjustments may also be specified in the data structure 480.

At the category-confidence blending operation 440, the category-based modifier 465 generated by the generator 430 is blended with the blending update to the category-based modifier 465 generated by the generator 435. The category-confidence blending operation 440 produces a category-confidence blended modifier 470. The modifier value for a particular pixel can be reduced from the amount determined in the category-based modifier 465 based on a level of confidence for that pixel in the confidence map 235. For example a pixel with maximum confidence level in the confidence map 235 can retain its modifier value from the category-based modifier 465. A modifier value for a pixel with low confidence level in the confidence map 235, on the other hand, can be decreased from its modifier value from the category-based modifier 465, therefore decreasing the strength of the effect that is applied by the ISP tuning parameter module at that pixel. For example, where the ISP tuning parameter module is the NR module 320 as illustrated in the conceptual diagram 400, a weaker NR effect is applied to pixels that the classification engine 220 categorized with low confidence than to pixels that the classification engine 220 categorized with high confidence. In some examples, blending for the category-based modifier 465 is performed with a No-Operation value. In some examples, the category-confidence blending operation 440 can be referred to as a category-confidence adjustment operation.

An example category-confidence blended modifier 470 is illustrated at the bottom of the conceptual diagram 400. The category-confidence blended modifier 470 is illustrated in greyscale. Similarly to the example category-based modifier 465, the lighter shades of grey in the category-confidence blended modifier 470 represent settings associated with higher levels of NR, whereas darker shades represent settings associated with lower levels of NR. Because the blending update that is based on the confidence values is blended with, and therefore adjusts, the predetermined settings (e.g., the modifier values in the category-based modifier 465), the category-confidence blended modifier 470 may have portions corresponding to settings that do not match the predetermined settings associated with any particular category of object. The blending may, for example, be performed via addition, subtraction, or multiplication of values in the blending update to the category-based modifier 465 with settings in the category-based modifier 465. This more fine-tuned control over the ISP tuning parameter modules allows the ISP 240 to apply its ISP tuning parameters less strongly to areas in which it has less confidence it is categorization, for example. This reduces the risk of improper setting being applied to a portion of an image due to miscategorization of the portion of the image. For those portions of the image that are most likely to be miscategorized—those with low confidence in the categorization—the setting is weakened or otherwise adjusted so that the ISP tuning parameter is more conservatively applied. The category-confidence blended modifier 470 of FIG. 4 may visually appear to have visible banding between different shades of grey, for instance where a gradient between shades is present. The banding in the category-confidence blended modifier 470 may be inherited from the banding in the confidence map 235 of FIG. 4, from the distinct shades corresponding to distinct image regions of the category-based modifier 465, or a combination thereof.

The category-confidence blended modifier 470 is then passed through a low pass filter 445 to produce a filtered modifier 475. An example of the filtered modifier 475 is illustrated at the bottom of the conceptual diagram 400. The filtered modifier 475 is similar to the category-confidence blended modifier 470, but transitions between different settings are smoothed out. For example, the boundaries between image regions in the category-confidence blended modifier 470 may include banding resulting from different levels of confidence from the confidence map 235, different image regions in the category-based modifier 465, or combinations thereof. In the filtered modifier 475, the banding is smoothed out with intermediate values, resulting in a blurring effect. This allows transitions between different settings applied using the module (here, NR) to be smoother than the transitions would be using the category-confidence blended modifier 470. The filtered modifier 475 is upscaled using an upscaler 450 to generate the final modifier 455. The upscaler 450 can perform this upscaling using, for instance, nearest neighbor (NN) upscaling, bilinear interpolation, bicubic interpolation, Sinc resampling, Lanczos resampling, box sampling, mipmapping, Fourier-transform scaling, edge-directed interpolation, high quality scaling (hqx), or some combination thereof. The map decoder 325 sends the final modifier 455 to the NR module logic 405 of the NR module 320. The final modifier 455 may be one of a set of one or more modifiers 327. The NR module logic 405 of the NR module 320 applies NR to each pixel of the first copy of the raw image data 210 at a strength based on the final modifier 455. The strength may range from a minimum strength within a predetermined range, represented by the darkest greys in the example filtered modifier 475, to a maximum strength within the predetermined range, represented by white in the example filtered modifier 475. In some examples, the low-pass filter 445 may include a Gaussian blur filter. In some examples, the low-pass filter 445 may be supplemented with, or replaced by, another type of filter or blurring effect, such as an average filter, a box blur, a lens blur, a radial blur, a motion blur, a shape blur, a smart blur, a surface blur, or a combination thereof.

As described above, the diagram 400 illustrates generation of modifiers 327 by the map decoder 325 corresponding to the NR module 320. Largely the same process can be used by the map decoder 335 to generate the modifiers 337 for the sharpening module 330, by the map decoder 345 to generate the modifiers 347 for the TM module 340, and by the map decoder 355 to generate the modifiers 357 for the CS module 350. The main difference for the other map decoders 335, 345, and 355 is that a different data structure 480 would be used that stores predetermined settings for the module corresponding to these map decoders. Alternately, the data structure 480 may store predetermined settings for multiple modules, for example in different columns of a table, in which case the same data structure 480 may be used, but a different column queried.

Figure 5A:
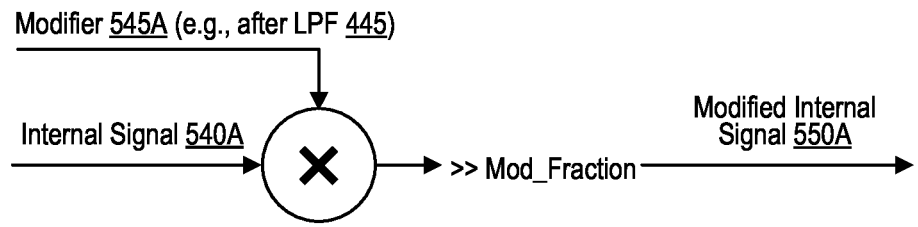
FIG. 5A is a conceptual diagram illustrating application of a modifier at an ISP module, with the modifier being applied as a multiplier.

FIG. 5A is a conceptual diagram 510 illustrating application of a modifier 545A at an ISP module, the modifier 545A applied as a multiplier. An internal signal 540A is received. The internal signal 540A represents a default setting, or a default strength with which the module applies the ISP tuning parameter to a portion of image data. A modifier 545A (such as one to which a low-pass filter (LPF) 445 has been applied) is received. The modifier 545A identifies a value for every pixel of the image data. The filtered modifier 475 and/or the final modifier 455 are examples of the modifier 545A. Like the filtered modifier 475, the modifier 545A may be stored as an image with different shades of grey—different luminance values—at each pixel. Alternately, the modifier 545A may be stored as a matrix or table or other data structure with cells corresponding to every pixel of the image data. For a given pixel of image data, the module takes the internal signal 540A—the default setting with which to apply the ISP tuning parameter—and multiplies that internal signal 540A by a value in the modifier 545A corresponding to that pixel in the image data.

For instance, the internal signal 54A0 may indicate that the default setting, or the default strength, at which to apply a particular ISP parameter is 3. The modifier 545A may include a value of 1.6 corresponding to a given pixel of the image data, meaning the ISP tuning parameter is applied at 1.6 times the default setting indicated by the internal signal 540 at that pixel of the image data, or 3*1.6=4.8. The modifier 545A may include a value of 0.8 corresponding to a different pixel of the image data, meaning the ISP tuning parameter is applied at 0.8 times the default setting indicated by the internal signal 540A at that pixel of the image data, or 3*0.8=2.4. The modified internal signal 550A is the result of this multiplication and therefore the strength at which the module ultimately applies the ISP tuning parameter for a given portion of image data. The modified internal signal 550A can, in some cases, be expressed a decimal value or as a fraction. Alternately, the modified internal signal 550A can be rounded to the nearest whole number, or a floor or ceiling function can be applied to round it to the nearest whole number less than the multiplication result or greater than the multiplication result, respectively.

In some cases, the modified internal signal 550A produced by multiplying the default setting from the internal signal 540A by the modifier 545A may be equivalent to one of a set of predetermined settings that correspond to different categories of objects and/or confidence levels. In some cases, the modified internal signal 550A may be between two settings of a set of predetermined settings, or may be outside of a range represented by the set of predetermined settings.

Figure 5B:
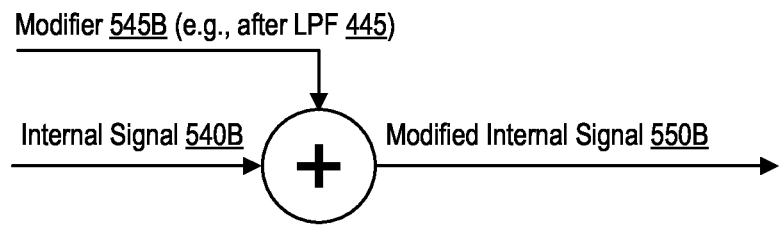
FIG. 5B is a conceptual diagram illustrating application of a modifier at an ISP module, with the modifier being applied as an offset.

FIG. 5B is a conceptual diagram 520 illustrating application of a modifier 545B at an ISP module, the modifier 545B applied as an offset. The conceptual diagram 520 includes an internal signal 540B and a modifier 545B. The internal signal 540B may be the same as the internal signal 540A. The modifier 545B may be the same as the modifier 545A. However, in the conceptual diagram 520, the value in the modifier 545B for a given pixel is added to the value in the internal signal 540B to produce the modified internal signal 550B.

For instance, the internal signal 540B may indicate that the default setting, or default strength, at which to apply a particular ISP parameter is 3. The modifier 545B may include a value of 1.6 corresponding to a given pixel of the image data, meaning the ISP tuning parameter is applied at 1.6 plus the default setting indicated by the internal signal 540B at that pixel of the image data, or 3+1.6=4.6. The modifier 545 may include a value of −0.8 corresponding to a different pixel of the image data, meaning the ISP tuning parameter is applied at −0.8 plus the default setting indicated by the internal signal 540B at that pixel of the image data, or 3−0.8=2.2. The modified internal signal 550B is the result of this sum, and therefore the strength at which the module ultimately applies the ISP tuning parameter for a given portion of image data.

In some cases, the modified internal signal 550B produced by summing together the default setting from the internal signal 540B by the modifier 545B may be equivalent to one of a set of predetermined settings that correspond to different categories of objects and/or confidence levels. In some cases, the modified internal signal 550B may be between two settings of a set of predetermined settings, or may be outside of a range represented by the set of predetermined settings.

Figure 5C:
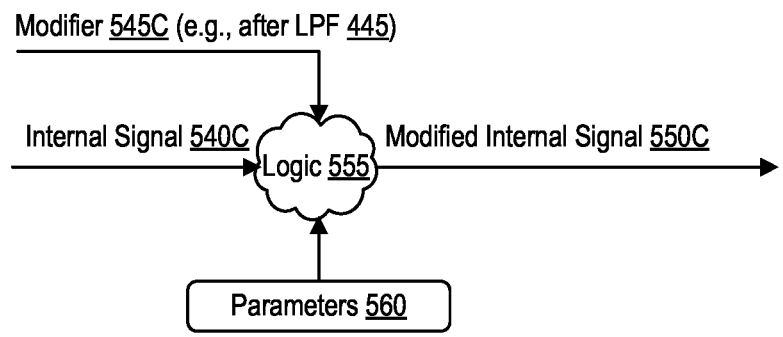
FIG. 5C is a conceptual diagram illustrating application of a modifier at an ISP module, with the modifier being applied using logic based on parameters.

FIG. 5C is a conceptual diagram 530 illustrating application of a modifier 545C at an ISP module, the modifier 535C applied using logic 555 based on parameters 560. The conceptual diagram 530 includes an internal signal 540C and a modifier 545C. The internal signal 540C may be the same as the internal signal 540A and/or the internal signal 540B. The modifier 545C may be the same as the modifier 545A and/or the modifier 545B. However, in the conceptual diagram 530, the value in the modifier 545C for a given pixel represents a change from one predetermined setting to another predetermined setting.

For instance, the internal signal 540C may indicate that the default setting, or default strength, at which to apply a particular ISP parameter is 3. The modifier 545C may include a value of 2 corresponding to a given pixel of the image data, meaning the ISP tuning parameter is to be applied at that pixel of the image data at a strength selected from a list of predetermined settings by selecting the second consecutively greater predetermined setting from the list. If the list of predetermined settings includes the set {1.5, 3, 4, 6, 8}, for example, then the modified internal signal 550C is 6, because 6 is two values higher than the default setting (3) in the list. Similarly, if the modifier 545C has a value of −1 corresponding to a different pixel of the image data, and the same list of predetermined settings is used, then modified internal signal 550C is 1.5, because 1.5 is one value lower than the default setting (3) in the list. The list of predetermined settings may be taken from the data structure 480, may each correspond to different categories of object, and in some cases may be referred to as the parameters 560. In some examples, each predetermined setting in the list of predetermined settings may represent different categories of objects and/or different confidence levels. For example, if categories of object and the confidence levels are expressed within 8 bits in the category map 230 and confidence map 235, then the list of predetermined settings can include 256 different predetermined settings. In some cases, the list of predetermined settings can include intermediate predetermined settings that lie in between two other predetermined settings corresponding to specific categories of object and confidence levels. Use of such intermediate predetermined settings can help create smoother transitions with less banding in the processed image 250, and can assist in putting into effect the smoothing produced by the low pass filter 445. In some examples, the logic 555 can include a combination of multiplication 510, offset 520, and/or other arithmetic operations instead of or in addition to the operations discussed above. In some examples, the logic 555 can blend together the modifier 545C with data from the parameters 560 instead of or in addition to the operations discussed above. In some examples, the logic 555 can include conditional programming (e.g., if . . . else), loops, and/or other programming logic instead of or in addition to the operations discussed above. The determination of the modified internal signal 550C as discussed above may be referred to as the application of the logic 555 based on the parameters 560, as an application of a logic engine that determines the modified internal signal 550C using the logic 555 based on the parameters 560, or a combination thereof.

Figure 6:
FIG. 6 is a conceptual diagram illustrating visual image artifacts introduced through anomalies in segmentation of an image into image regions during generation of a category map.
Figure 6:
Figure 6:

FIG. 6 is a conceptual diagram illustrating visual image artifacts introduced through anomalies in segmentation of an image into image regions during generation of a category map. In particular, FIG. 6 includes a first image 610, a second image 620, and a third image 630. The first image 610 is an image of two buildings and a tree, with a blue sky as a background. The first image 610 in FIG. 6 represents raw image data that has not yet been processed by the ISP 240 based on object category.

The second image 620 is similar to the first image 610, but includes a white image region labeled as the sky image region 625. The sky image region 625 represents the portions of the first image 610 within which the classification engine 220 detected as depicting the sky. Sky is a category of object in this example. Thus, the sky image region 625 is an image region which the classification engine 220 detected as depicting the "sky" category of object. The boundaries of the sky image region 625 include artifacts 640 in certain areas near the boundaries of the regions of the first image 610 that depict the sky and the regions depicting buildings and trees. These anomalies can be produced as a result of imperfect detection of category of object, for instance due to similar shades of blue appearing in the sky and in the building windows, or due to the complex boundaries of the tree leaves.

The third image 630 represents a version of the first image 610 that is processed by the ISP 240 based on object category using a category map that includes the sky image region 625 and that is based on the category segmentation of the second image 620. At the positions of the artifacts 640 in the sky image region 625 in the second image 620, the third image 630 includes visual image artifacts 645 in tone and color transitions. For example, areas of sky in the third image 630 near the boundaries of the building and the sky, and near the boundaries of the tree and the sky, appear brighter and less saturated than the rest of the sky. These artifacts 645 ended up lighter and less saturated did not fall within the sky image region 625 in the second image 620 due to the artifacts 640. In situations like these, sudden transitions from one setting to another may produce these types of visual image artifacts, or similar visual image artifacts. Smoother transitions between one setting and another can reduce the appearance of such artifacts in similar situations. Smoother transitions can be achieved by producing smoother modifiers corresponding to the sky image region 625, for instance by using techniques illustrated in FIG. 7 to produce smoothed modifiers such as those illustrated in FIG. 8.

Figure 7:
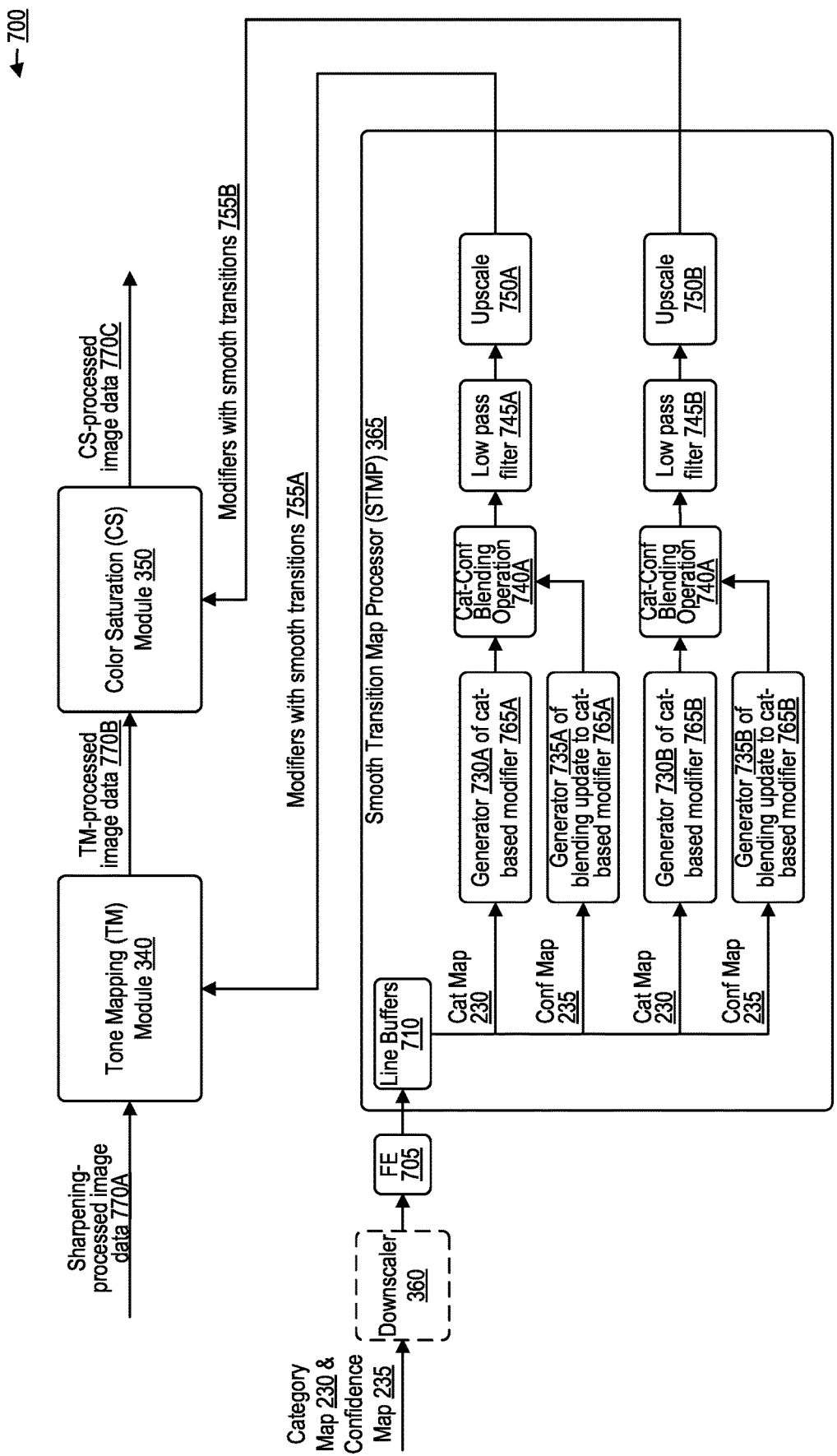
FIG. 7 is a conceptual diagram illustrating a smooth transition map processor pipeline.

FIG. 7 is a conceptual diagram 700 illustrating a smooth transition map processor (STMP) 365 pipeline. The STMP 365 produces smooth transitions from one setting to another setting within the same image. The STMP 365 functions similarly to two map decoders 435 combined into one component as discussed below, providing modifiers 755A to the TM module 340 and modifiers 755B to the CS module 350. However, the category map 230 and confidence map 235 may be passed through an additional downscaler 360 and a front-end (FE) 705 before generating modifiers 755A and 755B at the STMP 365. The additional downscaling provided by the downscaler 360, when upscaled by the upscalers 750A and 750B, effectively produces a blurring effect on the boundaries between different settings. The STMP 365 can, in some cases, also use low pass filters 745A and 745B that are stronger than the low pass filter 445, which can further smooth out the transitions between different settings to reduce banding in the transition. In some examples, the low-pass filters 745A and 745B may include a Gaussian blur filter. In some examples, the low-pass filters 745A and 745B may be supplemented with, or replaced by, another type of filter or blurring effect, such as an average filter, a box blur, a lens blur, a radial blur, a motion blur, a shape blur, a smart blur, a surface blur, or a combination thereof.

Similarly to the map decoder 435 STMP 365, the line buffer 710 routes the category map 230 to two generators 730A and 730B of the category-based modifiers 765A and 765B, which each function similarly to the generator 430 of the category-based modifier 465. The line buffer 710 routes the confidence map 235 to two generators 735A and 735B of the blending update to the category-based modifiers 765A and 765B, which each function similarly to the generator 435 of the blending update to the category-based modifier 465. The category-confidence blending operation 740A blends the category-based modifier 765A with the blending update to the category-based modifier 765A similarly to the category-confidence blending operations 440. The resulting blended modifiers are filtered by a low pass filter 745A and upscaled by the upscaler 750A, producing modifiers with smooth transitions 755A (which are examples of the modifiers 347B). The modifiers with smooth transitions 755A are sent from the STMP 365 to the TM module 340 in place of the modifiers 347A. Likewise, the category-confidence blending operation 740B blends the category-based modifier 765B with the blending update to the category-based modifier 765B similarly to the category-confidence blending operations 440. The resulting blended modifier is filtered by a low pass filter 745B and upscaled by the upscaler 750B, producing modifiers with smooth transitions 755B (which are examples of the modifiers 357B). The modifiers with smooth transitions 755B are sent from the STMP 365 to the CS module 350 as an example of the modifiers 347B.

The TM module 340 processes the sharpening-processed image data 770A based on the modifiers with smooth transitions 755A to generate the TM-processed image data 770B, which is sent on to the CS module 350. The CS module 350 processes the TM-processed image data 770B based on the modifiers with smooth transitions 755B to generate the CS-processed image data 770C, which can be the processed image 250 or can be sent on to another component in the ISP 240 for further processing to produce the processed image 250. While not illustrated in the diagram 700, the STMP 365 may also generate modifiers for, and pass the generated modifiers to, the NR module 320 and/or the sharpening module 325. In some examples, the TM module 340 can use both STMP-based modifier 347B/755A and Map-Decoder-based modifier 347A in parallel and enjoy both low-resolution processing modification+high-resolution processing modification. In some examples, the CS module 350 can use both STMP-based modifier 357B/755B and Map-Decoder-based modifier 357A in parallel and enjoy both low-resolution processing modification+high-resolution processing modification.

Figure 8:
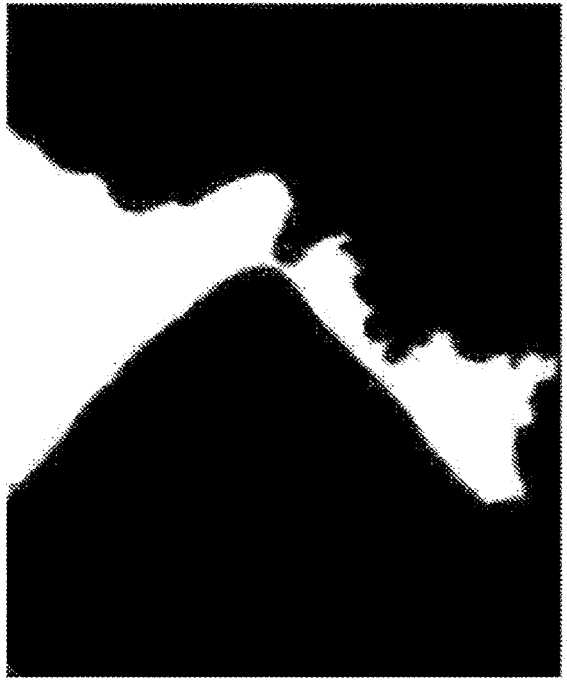
FIG. 8 is a conceptual diagram illustrating smoothing of modifiers corresponding to an image region using the smooth transition map processor.
Figure 8:
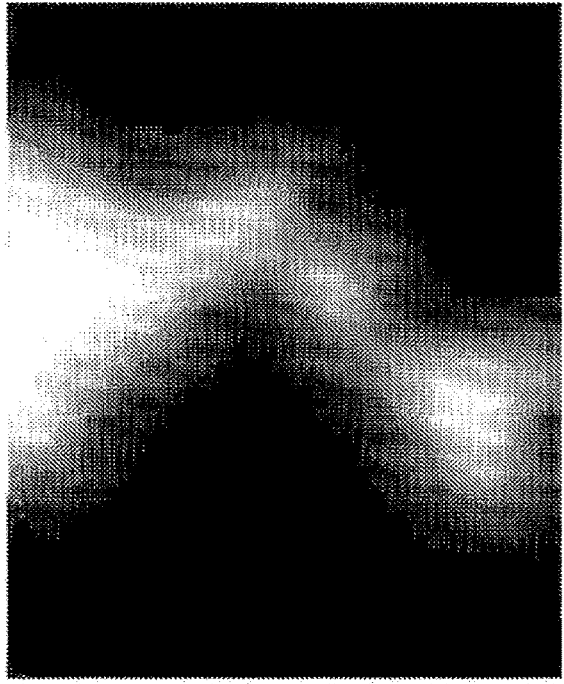
Figure 8:
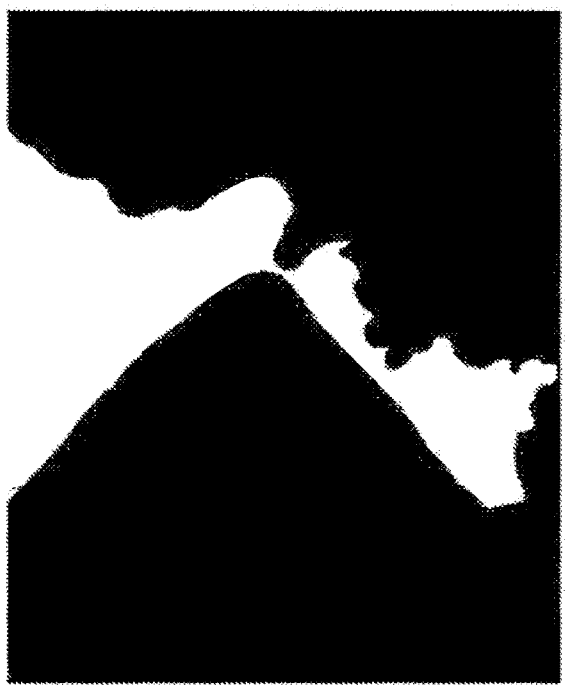
Figure 8:

FIG. 8 is a conceptual diagram illustrating smoothing of modifiers corresponding to an image region using the smooth transition map processor. In particular, FIG. 8 illustrates four versions of a modifier generated based on the sky image region 625 of FIG. 6 that are generated using different scaling by the STMP 365. The first modifier 810 is generated using 1:1 scaling, meaning that the downscaler 360 is either missing or performs no downscaling of the category map 230 and/or the confidence map 235. As a result, the boundaries between the region in the first modifier 810 corresponding to the sky image region 625 and the other regions in the first modifier 810 are sharp.

The second modifier 820 is generated using 1:4 scaling, meaning that the downscaler 360 downscales the category map 230 and/or the confidence map 235 to ¼ of the original size(s) of the category map 230 and/or the confidence map 235. As a result, the boundaries between the region in the second modifier 820 corresponding to the sky image region 625 and the other regions in the second modifier 820 are blurrier than the same boundaries in the first modifier 810. Similarly, a 1:16 scaling is used by the downscaler 360 to generate the third modifier 830, so the category map 230 and/or the confidence map 235 are downscaled to 1/16 of their original sizes. The boundaries in the third modifier 830 are thus blurrier than those in the second modifier 820. Finally, a 1:64 scaling is used by the downscaler 360 to generate the fourth modifier 840, so the category map 230 and/or the confidence map 235 are downscaled to 1/64 of their original sizes. The boundaries in the fourth modifier 840 are thus blurrier than those in the third modifier 830. Even higher levels of downscaling are possible than those illustrated in FIG. 8, such as a 1:256 scaling. Levels of downscaling in between any previously-discussed levels of downscaling are possible as well, such as 1:3 scaling, 1:6 scaling, 1:10 scaling, 1:32 scaling, 1:50 scaling, 1:100 scaling, or 1:128 scaling.

Figure 9:
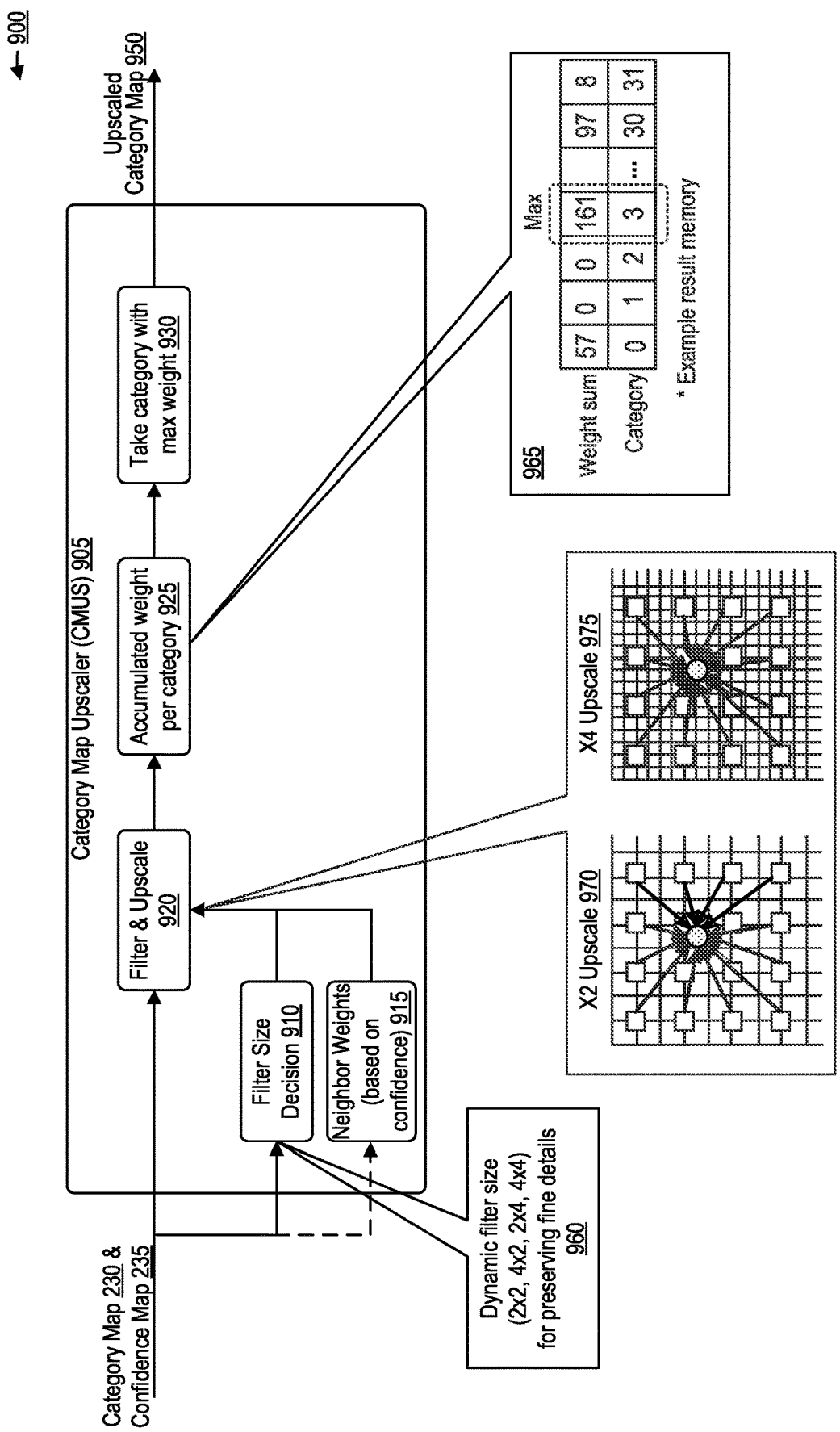
FIG. 9 is a diagram illustrating a category map upscaler (CMUS) pipeline.

FIG. 9 is a diagram 900 illustrating a category map upscaler (CMUS) 905 pipeline. A category map 230 generally cannot be upscaled using interpolation-based upscaling such as bilinear or bicubic interpolation, since all of the values in the category map 230 represent specific categories of object. Interpolation can create intermediate values that may refer to unintended categories of object, or nonexistent categories of object. For example, a category map may exist with a pixel having a value of 2 neighboring a pixel having a value of 4. The value of 2 may, for instance, represent the sky category of object, while the value of 4 may represent the plant category of object. Upscaling using interpolation may create a pixel with a value of 3 in between the pixel having a value of 2 and the pixel having a value of 4. The value of 3 may represent yet another category of object, such as fabric, which may correspond to completely different ISP tuning settings than sky or plants, and may result in visual artifacts if used for image processing based on object categorization. Alternately, the value of 3 may not represent any known category of object at all, which may result in errors or visual artifacts if used for image processing based on object categorization.

One method that can be used to upscale category maps without the issues that come from interpolation-based upscaling is nearest-neighbor (NN) upscaling. NN upscaling creates no intermediate values. However, NN upscaling can produce sharp, blocky edges. Sometimes, narrow curved objects depicted in an image, such as a person's eyebrow, a shadow, or a clothing strap, can appear especially blocky and inaccurate as a result of NN upscaling. Category map upscaling (CMUS), also referred to as NN modified with spatial weight filtering, more accurately upscales category maps without introducing issues associated with interpolation such as intermediate values. The improvement in upscaling is particularly noticeable in boundaries between image regions and in narrow image regions.

The CMUS 905 pipeline of the conceptual diagram 900 uses the category map 230 inputs to a filter and upscale operation 920 as well as a filter size decision operation 910. The filter size decision operation 910 can adaptively select one of a set of filter sizes for upscaling a given pixel, such as a filter with a size of 2×2 pixels, 4×2 pixels, 2×4 pixels, or 4×4 pixels. To preserve finer details, smaller filters are used for narrow or small image regions in the category map 230. Neighbor weights 915, which are based on the confidence map 235, are provided to the filter and upscale operation 920. Two examples with a doubling (×2) upscaling 970 and a quadrupling (×4) upscaling 975 are illustrated, with the circular point (pixel) interpolated from the square points (neighboring pixels) based on confidence in the categories of the square points, distance from the square points to the circular points, or a combination thereof.

An accumulated weight per category is calculated in operation 925. An example of this calculation is provided in example 965. Neighboring pixels with lower levels of confidence in the confidence map 235 can have lower weights in the neighbor weights 915 than neighboring pixels with higher levels of confidence in the confidence map 235, and can therefore contribute less to the weight sum. Neighboring pixels that are farther from the pixel(s) being upscaled can also have lower weights than neighboring pixels that are closer to the pixel(s) being upscaled, and can therefore contribute less to the weight sum. In other words, neighboring pixels that are closer to the pixel(s) being upscaled can have higher weights than neighboring pixels that are farther from the pixel(s) being upscaled. In operation 930, the category with the maximum weight is used for the upscaled pixel in the upscaled category map 950. In some examples, the upscaler 310 can perform upscaling using NN upscaling, CMUS upscaling, or some combination thereof. In some examples, one or more of the upscalers 450, 750A, and 750B can perform upscaling using NN upscaling, CMUS upscaling, another upscaling technique discussed herein, or some combination thereof.

Figure 10:
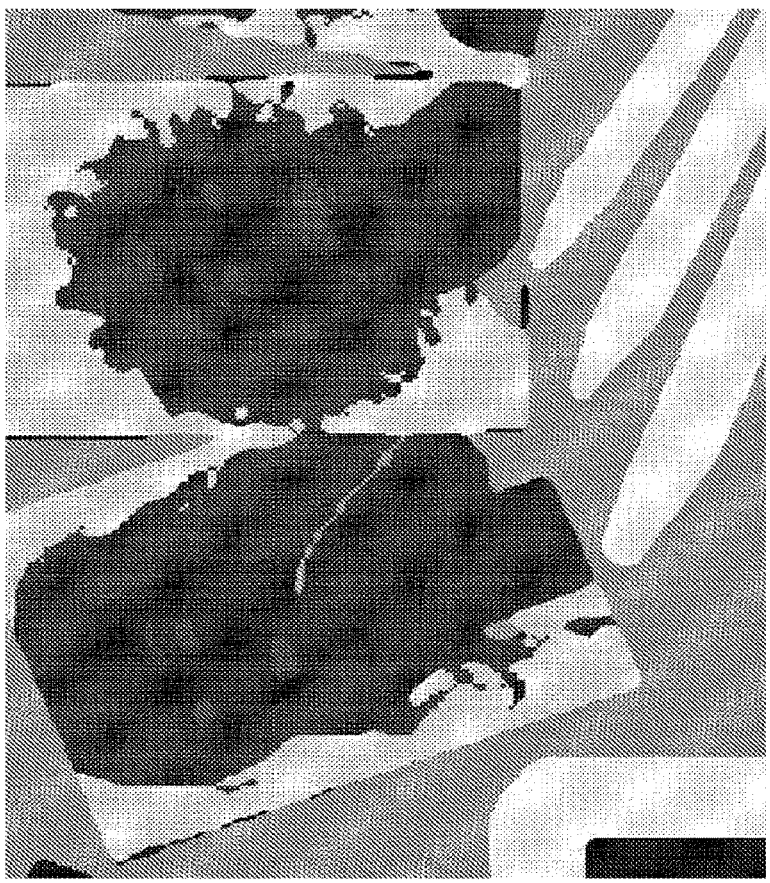
FIG. 10 is a diagram illustrating a comparison between a category map upscaled using nearest neighbor upscaling and the same category map upscaled using nearest neighbor upscaling modified with spatial weight filtering applied using the category map upscaler (CMUS)
Figure 10:
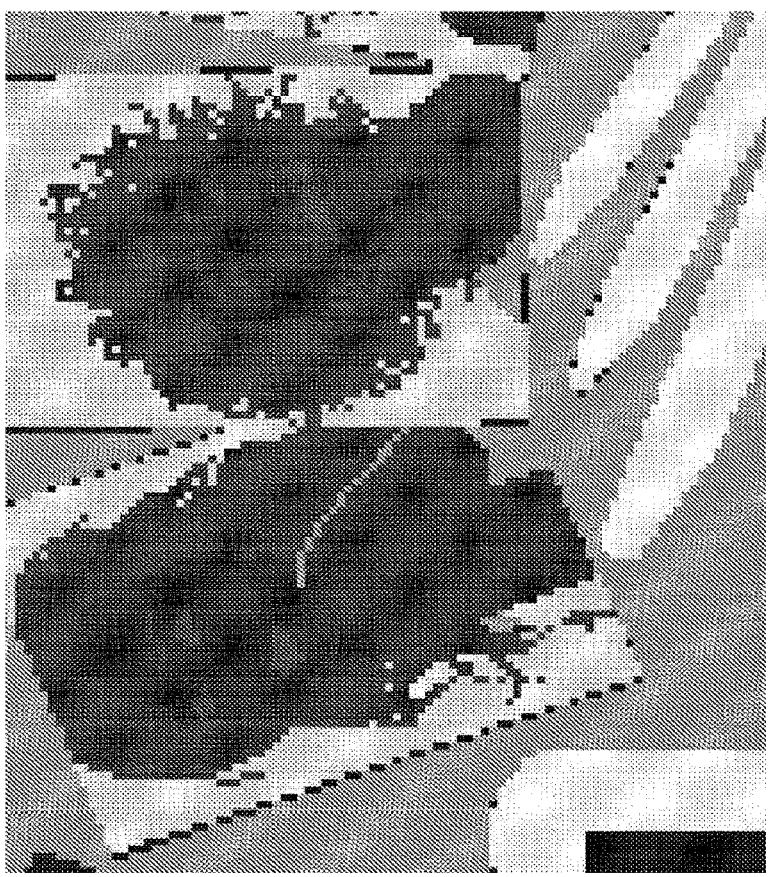

FIG. 10 is a diagram illustrating a comparison between a category map upscaled using nearest neighbor upscaling and the same category map upscaled using nearest neighbor upscaling modified with spatial weight filtering applied using the category map upscaler (CMUS) 905. The category maps in FIG. 10 are based on the same image—an image of a surface of a desk with a photograph of a man, a photograph of a woman, three pens, and a corner of a tablet device resting atop the desk. The category maps both include various image regions depicted using different shades of grey. The first category map 1010 in FIG. 10 is upscaled using NN upscaling. The boundaries of the various image regions in the first category map 1010 are extremely blocky and jagged due to use of NN upscaling.

The second category map 1020 of FIG. 10 is the same category map as the first category map 1010, but upscaled using category map upscaling (CMUS) rather than ordinary nearest neighbor upscaling. Category map upscaling (CMUS) may also be referred to as NN upscaling modified with spatial weight filtering. As a result, boundaries between different image regions are more rounded where appropriate, and less blocky overall. The improvement in upscaling fidelity is especially noticeable in narrow image regions, such as the image region representing the clothing strap of the woman in the photograph.

Figure 11:
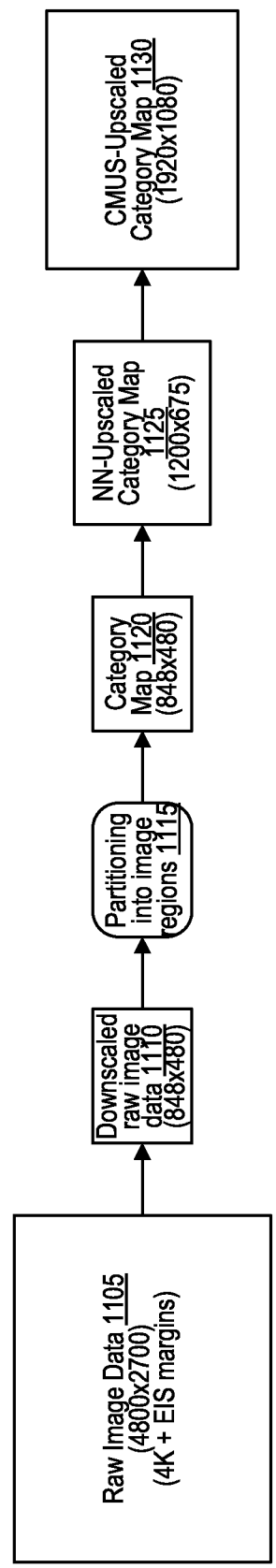
FIG. 11 is a conceptual diagram illustrating example resolutions of image data corresponding to the category map during the downscaling and upscaling operations.

FIG. 11 is a conceptual diagram 1100 illustrating example resolutions of image data corresponding to the category map during the downscaling and upscaling operations. In the conceptual diagram 1100, the raw image data 1105 captured by the image sensor 205 has a 4K resolution plus an electronic image stabilization (EIS) margin, resulting in a 4800×2700 resolution. The raw image data is downscaled at operation 1110 to a resolution of 848×480. This is the downscaling illustrated in the second copy of the raw image data 215 of FIG. 2, which may be performed using a downscaler. This downscaler may be part of the image sensor 205, at the classification engine 220, at the ISP 240, or at another component not illustrated in FIG. 2. The classification engine 220 partitions the downscaled image data from the operation 1110 into image regions at operation 1115 to produce the category map 1120, which also has a resolution of 848×480. In the example of the conceptual diagram 1100, the category map 1120 is upscaled once using an NN upscaling operation 1125, to a resolution of 1200× 675. This once-upscaled category map is upscaled again using a CMUS upscaling operation 1130, to a resolution of 1920×1080. In some examples, the upscaler 310 can perform one or both of the upscaling operations 1125 and/or 1130. In some examples, an upscaler in the classification engine 220 can perform one or both of the upscaling operations 1125 and/or 1130. In some examples, an upscaler in the ISP 240 can perform one or both of the upscaling operations 1125 and/or 1130.

Figure 12A:
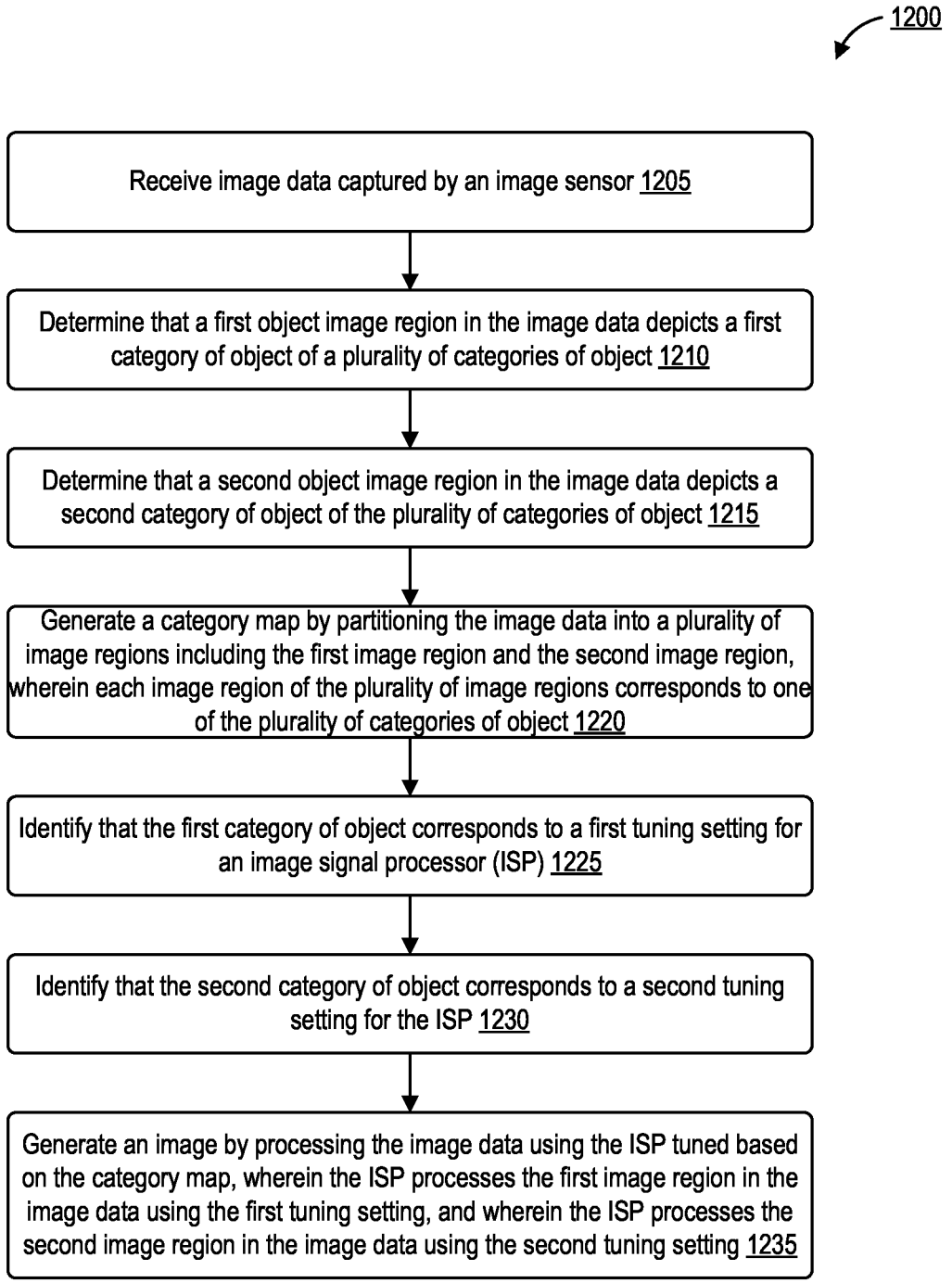
FIG. 12A is a flow diagram illustrating an image processing technique.

FIG. 12A is a flow diagram 1200 illustrating an image processing technique. The image processing technique illustrated by the flow diagram 1200 may be performed by a device. The device may be an image capture and processing device 100, an image capture device 105A, an image processing device 105B, a classification engine 220, an ISP 240, an image sensor 205, one or more network servers of a cloud service, a computing system 1500, or some combination thereof.

At operation 1205, as part of the image processing technique, the device receives image data captured by an image sensor 205. In some cases, the device may include a connector coupled to the image sensor 205, and the image data may be received using the connector. The connector may include a port, a jack, a wire, an input/output (IO) pin, a conductive trace on a printed circuit board (PCB), any other type of connector discussed herein, or some combination thereof. In some cases, the device may include the image sensor 205.

In some examples, the image data can be raw image data. In some examples, the device can demosaic the image data.

In one illustrative example, the device can demosaic the image data after receiving the image data in operation 1205 but before at least one of the other operations 1210-1235. In some examples, the device can convert the image data from a first color space to a second color space. In one illustrative example, the device can convert the image data from the first color space to the second color space after receiving the image data in operation 1205 but before at least one of the other operations 1210-1235. In some examples, the second color space is a YUV color space. In some examples, the second color space is a RGB color space. In some examples, the first color space is the RGB color space. In some examples, the first color space is the Bayer color space or another color space associated with one or more color filters over the image sensor 205.

At operation 1210, as part of the image processing technique, the device determines that a first object image region in the image data depicts a first category of object of a plurality of categories of object. At operation 1215, as part of the image processing technique, the device determines that a second object image region in the image data depicts a second category of object of the plurality of categories of object.

At operation 1220, as part of the image processing technique, the device generates a category map 230 by partitioning the image data into a plurality of object image regions including the first object image region and the second object image region. Each of the plurality of regions corresponds to one of the plurality of categories of object (e.g., a first region corresponding to a first object, a second region corresponding to a second object, etc.). In some aspects, the device also generates a downscaled copy of the image data by downscaling the image data. Generating the category map based on the image data includes generating the category map based on the downscaled copy of the image data.

Though not illustrated in the flow diagram 1200, the operation 1220 can also include generating a confidence map 235 based on the image data. The confidence map 235 identifies a plurality of confidence levels corresponding to a plurality of portions of the image data. Each confidence level of the plurality of confidence levels identifies a degree of confidence in determining that a corresponding portion of the plurality of portions depicts one of the plurality of categories of object. In one example, the confidence map 235 and the category map 230 are a single file storing a single value for each pixel. A first plurality of bits in that value represent a category of object that the classification engine 220 classifies the pixel as depicting. A second plurality of bits in that value represent the confidence of the classification engine 220 in classifying the pixel as depicting the category of object. In another example, the confidence map 235 and the category map 230 are a single file storing two values per pixel, where one value represents the category of object and the other value represents the confidence.

In some aspects, the device also upscales the category map. In some examples, upscaling the category map can include upscaling the category map to a size that matches a size of at least one of the image data and the image. In some examples, the category map can be upscaled using nearest-neighbor upscaling or using modified nearest-neighbor upscaling (e.g., modified with spatial weight filtering, which can also be referred to herein as category map upscaling (CMUS)). Upscaling the category map using nearest-neighbor upscaling modified with spatial weight filtering can include identifying a first filter size corresponding to the first object image region and a second filter size corresponding to the second object image region. The first filter size is smaller than the second filter size. Upscaling the category map using nearest-neighbor upscaling modified with spatial weight filtering can include upscaling a first pixel within the first object image region based on the first filter size and one or more weights associated with one or more confidence values from the confidence map corresponding to one or more pixels neighboring the first pixel. Upscaling the category map using nearest-neighbor upscaling modified with spatial weight filtering can include upscaling a second pixel within the second object image region based on the second filter size and one or more weights associated with one or more confidence values from the confidence map corresponding to one or more pixels neighboring the second pixel.

At operation 1225, as part of the image processing technique, the device identifies that the first category of object corresponds to a first tuning setting for an image signal processor (ISP). At operation 1230, the image processing technique includes identifying that the second category of object corresponds to a second tuning setting for the ISP. The first tuning setting and the second tuning setting can include indicators of different strengths at which a noise reduction (NR) ISP tuning parameter is applied during the processing of the image data. The first tuning setting and the second tuning setting can include indicators of different strengths at which a sharpening ISP tuning parameter is applied during the processing of the image data. The first tuning setting and the second tuning setting can include indicators of different strengths at which a color saturation (CS) ISP tuning parameter is applied during the processing of the image data. The first tuning setting and the second tuning setting can include indicators of different strengths at which a tone mapping (TM) ISP tuning parameter is applied during the processing of the image data. The first tuning setting and the second tuning setting can include indicators of different strengths at which a gamma ISP tuning parameter is applied during the processing of the image data. The first tuning setting and the second tuning setting can include indicators of different strengths at which a different ISP tuning parameter is applied during the processing of the image data. The different ISP tuning parameter can include, for example, gain, luminance, shading, edge enhancement, image combining for high dynamic range (HDR), special effects processing (e.g., background replacement, bokeh effect), artificial noise adder, demosaicking, edge-directed upscaling, other processing parameters discussed herein, or combinations thereof.

In some cases, as described above, the first setting, the second setting, and/or the first and second tuning settings are defined based on user input that is associated with the first object image region and the second object image region. In some cases, as described above, at least one of the first setting and the second setting are automatically determined.

At operation 1235, as part of the image processing technique, the device generates an image by processing the image data using the ISP tuned based on the category map. For example, the ISP can process the first object image region in the image data using the first tuning setting. The ISP can process the second object image region in the image data using the second tuning setting. In some cases, generating the image includes processing the raw image data using the ISP tuned based on the category map and the confidence map.

In some aspects, the device also generates one or more modifiers based on the category map. The one or more modifiers identify at least one of a first deviation or a second deviation. The first deviation is a deviation from a default setting that the ISP applies in the first object image region during the processing of the image data. The second deviation is a deviation from the default ISP tuning setting that the ISP applies in the second object image region during the processing of the image data. In some aspects, the ISP identifies at least one of the first deviation or the second deviation by performing an arithmetic function of one or more modifiers and the default tuning setting. The arithmetic function can include at least one of a multiplication function, an addition function, a subtraction function, a division function, or some combination thereof. The multiplication function can multiply the one or more modifiers by the default tuning setting, for instance as illustrated in FIG. 5A. The sum function can add the one or more modifiers to the default tuning setting, for instance as illustrated in FIG. 5C. The subtraction function can subtract the one or more modifiers from the default tuning setting, or vice versa. The division function can divide the default tuning setting by the one or more modifiers, or vice versa. In some aspects, the ISP identifies at least one of the first deviation and the second deviation based on increments in a list of predetermined possible settings that includes the default setting, the increments based on the modifiers, for instance as illustrated in FIG. 5C. In some aspects, the device can downscale the category map before generating the one or more modifiers based on the category map.

The device can generate one or more blended modifiers by blending the one or more modifiers with information corresponding to a confidence map. The device can generate one or more filtered modifiers by filtering the one or more blended modifiers using a low-pass filter. The device can generate one or more upscaled modifiers by upscaling the one or more filtered modifiers. Processing the image data using the ISP tuned based on the category map as in operation 1235 can include processing the image data using the one or more modifiers, the one or more blended modifiers, the one or more filtered modifiers, the one or more upscaled modifiers, or some combination thereof.

The image processing technique illustrated in the flow diagram 1200 may also include any operation discussed illustrated in, or discussed with respect to, any of the flow diagrams 1250, 1300, and/or 1400.

Figure 12B:
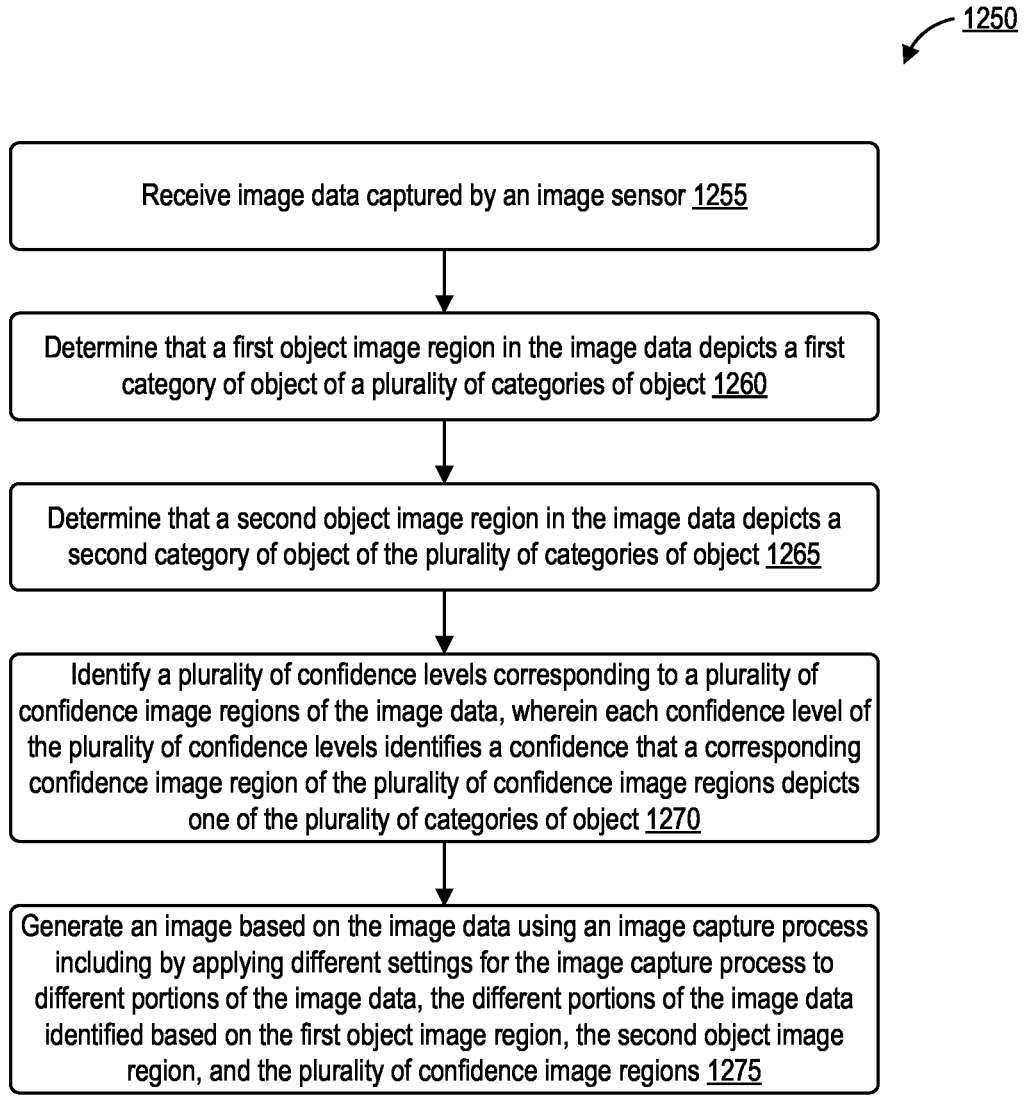
FIG. 12B is a flow diagram illustrating an image processing technique.

FIG. 12B is a flow diagram 1250 illustrating an image processing technique. The image processing technique illustrated by the flow diagram 1250 may be performed by a device. The device may be an image capture and processing device 100, an image capture device 105A, an image processing device 105B, a classification engine 220, an ISP 240, an image sensor 205, one or more network servers of a cloud service, a computing system 1500, or some combination thereof.

At operation 1255, as part of the image processing technique, the device receives image data captured by an image sensor 205. The operation 1205 of the flow diagram 1200 may be an example of the operation 1255 of the flow diagram 1250.

At operation 1250, as part of the image processing technique, the device determines that a object first image region in the image data depicts a first category of object of a plurality of categories of object. The operation 1210 of the flow diagram 1200 may be an example of the operation 1260 of the flow diagram 1250.

At operation 1265, as part of the image processing technique, the device determines that a second object image region in the image data depicts a second category of object of the plurality of categories of object. The operation 1215 of the flow diagram 1200 may be an example of the operation 1265 of the flow diagram 1250.

At operation 1270, as part of the image processing technique, the device identifies a plurality of confidence levels corresponding to a plurality of confidence image regions of the image data, wherein each confidence level of the plurality of confidence levels identifies a confidence that a corresponding confidence image region of the plurality of confidence image regions depicts one of the plurality of categories of object. The operation 1220 of the flow diagram 1200 may include the operation 1270 of the flow diagram 1250.

At operation 1275, as part of the image processing technique, the device generates an image based on the image data using an image capture process including by applying different settings for the image capture process to different portions of the image data, the different portions of the image data identified based on the first object image region, the second object image region, and the plurality of confidence image regions. The operation 1275 of the flow diagram 1250 may, in some examples, include at least a subset of at least one of the operations 1220, 1225, 1230, and/or 1235 of the flow diagram 1200. For example, some of the different portions of the image data may be different parts of the first object image region that have different confidence levels than one another. Some of the different portions of the image data may be different parts of the second object image region that have different confidence levels than one another. Some of the different portions of the image data may be outside of the first object image region and/or the second object image region.

In some examples, the image capture process includes generating one or more modifiers. The one or modifiers may identify a first deviation from a default setting for the image capture process for the first object image region, a second deviation from the default setting for the image capture process for the second object image region, or both. The different settings for the image capture process can be based on the one or more modifiers. The default setting can be a default strength at which a particular parameter (e.g., ISP parameter) is applied, and each deviation corresponding to each modifier may represent a weakening or a strengthening of that default strength. In some examples, as part of the image processing technique, the device adjusts the one or more modifiers. Adjusting the one or more modifiers can include blending the one or more modifiers with a blending update (e.g., the blending update generated by the generator 435 of FIG. 4) that is based on the plurality of confidence levels corresponding to the plurality of confidence image region. Blending the one or more modifiers with the blending update can adjust at least one of the first deviation and the second deviation in at least one area of the image data. The modification can further weaken or strengthen the strength at which a particular parameter (e.g., ISP parameter) is applied.

In some examples, as part of the image processing technique, the device generates a category map partitioning the image data into a plurality of object image regions including the first object image region and the second object image region. Each object image region of the plurality of object image regions corresponds to one of the plurality of categories of object. The device can identify that the first category of object corresponds to a first setting for the image capture process. The device can identify that the second category of object corresponds to a second setting for the image capture process. In some examples, as part of the image processing technique, the device generates a confidence map partitioning the image data into the plurality of confidence image regions corresponding to the plurality of confidence levels. The different portions of the image data can be identified (e.g., by the device) based on the category map and the confidence map.

In some examples, the image capture process can include the processing of the image data of operation 1235. In some examples, the first setting for the image capture process can be the first tuning setting discussed with respect to operations 1225 and 1235. In some examples, the second setting for the image capture process can be the second tuning setting discussed with respect to operations 1230 and 1235.

In some examples, the image capture process includes processing the image data using an image signal processor (ISP). The different settings for the image capture process can be different tuning settings for the ISP. In some examples, the different tuning settings for the ISP include different strengths at which an ISP tuning parameter is applied during processing of the image data using the ISP. The ISP tuning parameter can be, for example, one of noise reduction, sharpening, color saturation, color mapping, color processing, and tone mapping. In some examples, the different settings include a setting associated with at least one of: a lens position, a flash, a focus, an exposure, a white balance, an aperture size, a shutter speed, an ISO, an analog gain, a digital gain, a denoising, a sharpening, a tone mapping, a color saturation, a demosaicking, a color space conversion, a shading, an edge enhancement, an image combining for high dynamic range (HDR), a special effect, an artificial noise addition, an edge-directed upscaling, an upscaling, a downscaling, an electronic image stabilization, or a combination thereof. In some examples, the device processes the image data. Processing the image data can include demosaicking the image data and/or converting the image data from a first color space to a second color space (e.g., between Bayer color space, RGB color space, and/or YUV color space).

In some examples, as part of the image processing technique, the device receives a user input associated with at least one of the first object image region and the second object image region. At least one of the different settings can be defined based on the user input, and can correspond to either the first object image region or the second object image region. In some examples, applying the different settings for the image capture process to the different portions of the image data includes applying the different settings for the image capture process to the different portions of the image data using the image signal processor (ISP). In some examples, identifying the first object image region and the second object image region include identifying the first object image region and the second object image region using a classification engine that is at least partially positioned on an integrated circuit (IC) chip, such as an application specific integrated circuit (ASIC) chip. In some examples, as part of the image processing technique, the device displays the image on a display.

The image processing technique illustrated in the flow diagram 1250 may also include any operation discussed illustrated in, or discussed with respect to, any of the flow diagrams 1200, 1300, and/or 1400.

Figure 13:
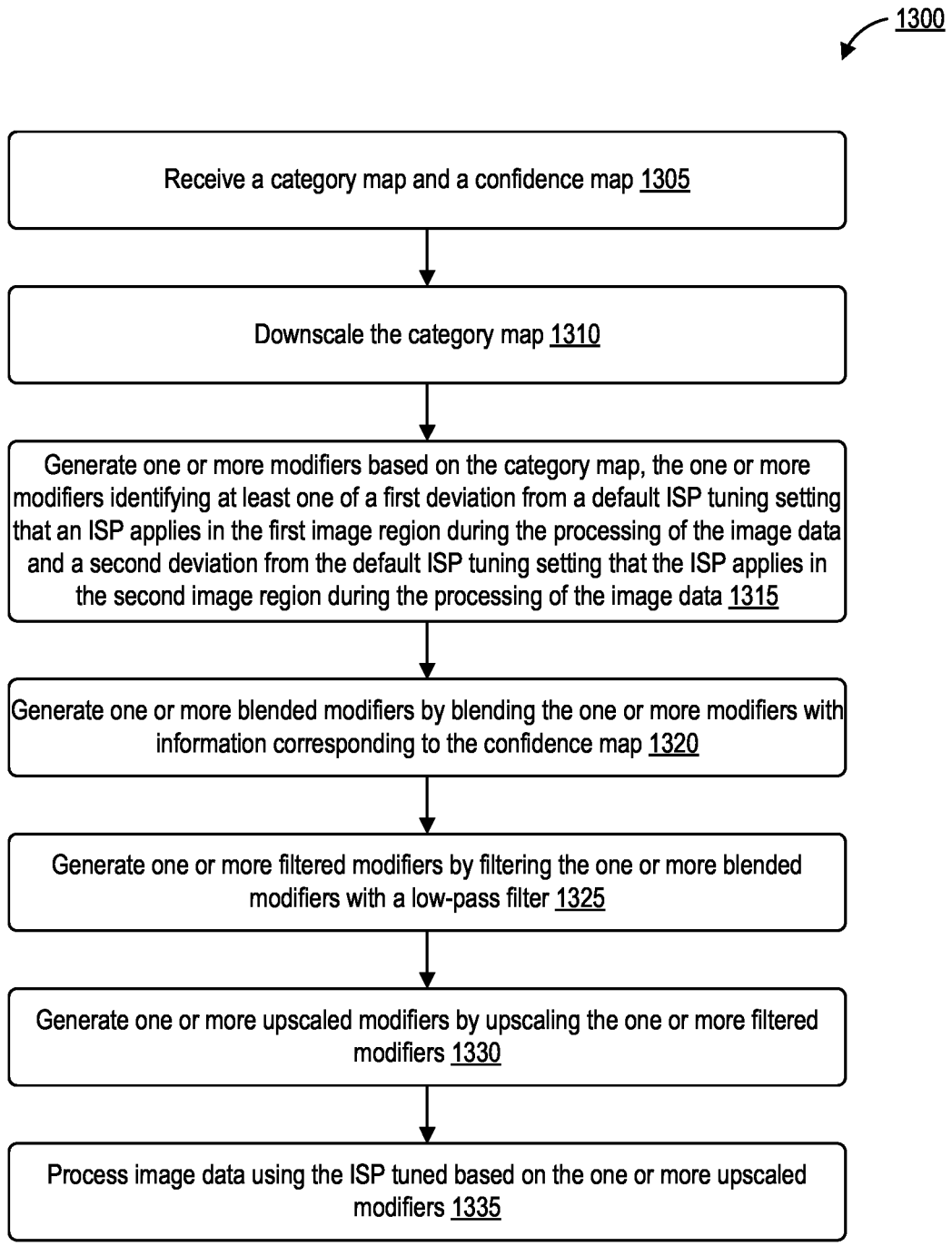
FIG. 13 is a flow diagram illustrating a transition smoothing technique.

FIG. 13 is a flow diagram 1300 illustrating a transition smoothing technique. The image processing technique illustrated by the flow diagram 1300 may be performed by a device. The device may be an image capture and processing device 100, an image capture device 105A, an image processing device 105B, a classification engine 220, an ISP 240, an image sensor 205, one or more network servers of a cloud service, a computing system 1500, or some combination thereof.

At operation 1305, the transition smoothing technique includes receiving a category map and a confidence map. At operation 1310, the transition smoothing technique includes downscaling the category map. In some examples, operation 1310 may be skipped so that the category map is not downscaled.

At operation 1315, the transition smoothing technique includes generating one or more modifiers based on the category map. For example, the one or more modifiers identify at least one of a first deviation from a default setting that an ISP applies in the first image region during the processing of the image data and a second deviation from the default setting that the ISP applies in the second image region during the processing of the image data. The internal signal 540 illustrated in FIG. 5A, FIG. 5B, and FIG. 5C may represent examples of the default setting. The category-based modifiers 465, 765A, and 765B may represent examples of the one or more modifiers based on the category map. The generators 430, 730A, and 730B may perform operation 1315.

At operation 1320, the transition smoothing technique includes generating one or more blended modifiers by blending the one or more modifiers with information corresponding to the confidence map. The category-confidence blending operations 440, 740A, and 740B (e.g., using confidence as a blending factor, such as by blending the modifier with a no-operation equivalent modifier value according to the confidence) may represent examples of the operation 1320. The blending updates to the category based modifiers 465, 765A, and 765B generated by the generators 435, 735A, and 735B may represent examples of the information corresponding to the confidence map.

At operation 1325, the transition smoothing technique includes generating one or more filtered modifiers by filtering the one or more blended modifiers with a low-pass filter (LPF). The LPFs 445, 745A, and 745B may represent examples of the LPF of operation 1325.

At operation 1330, the transition smoothing technique includes generating one or more upscaled modifiers by upscaling the one or more filtered modifiers. The upscalers 450, 750A, and 750B may perform the operation 1330.

At operation 1335, the transition smoothing technique includes processing image data using the ISP tuned based on the one or more upscaled modifiers. In one example, operation 1335 may be performed by module logic of an ISP tuning parameter module, such as the NR module logic 405 of the NR module 320.

In some cases, one or more of the operations 1305-1335 of the flow diagram 1300 can be performed by a device that performs the one or more of the operations 1205-1235 of the flow diagram 1200. In some cases, the transition smoothing technique of FIG. 13 may be part of the image processing technique of FIG. 12A. The image processing technique of FIG. 12A may represent at least some of the operations of the classification engine 220 and/or of the ISP 240. The transition smoothing technique of FIG. 13 may represent at least some of the operations of the STMP 365 and/or the downscaler 360.

The transition smoothing technique illustrated in the flow diagram 1300 may also include any operation discussed illustrated in, or discussed with respect to, any of the flow diagrams 1200, 1250, and/or 1400.

Figure 14:
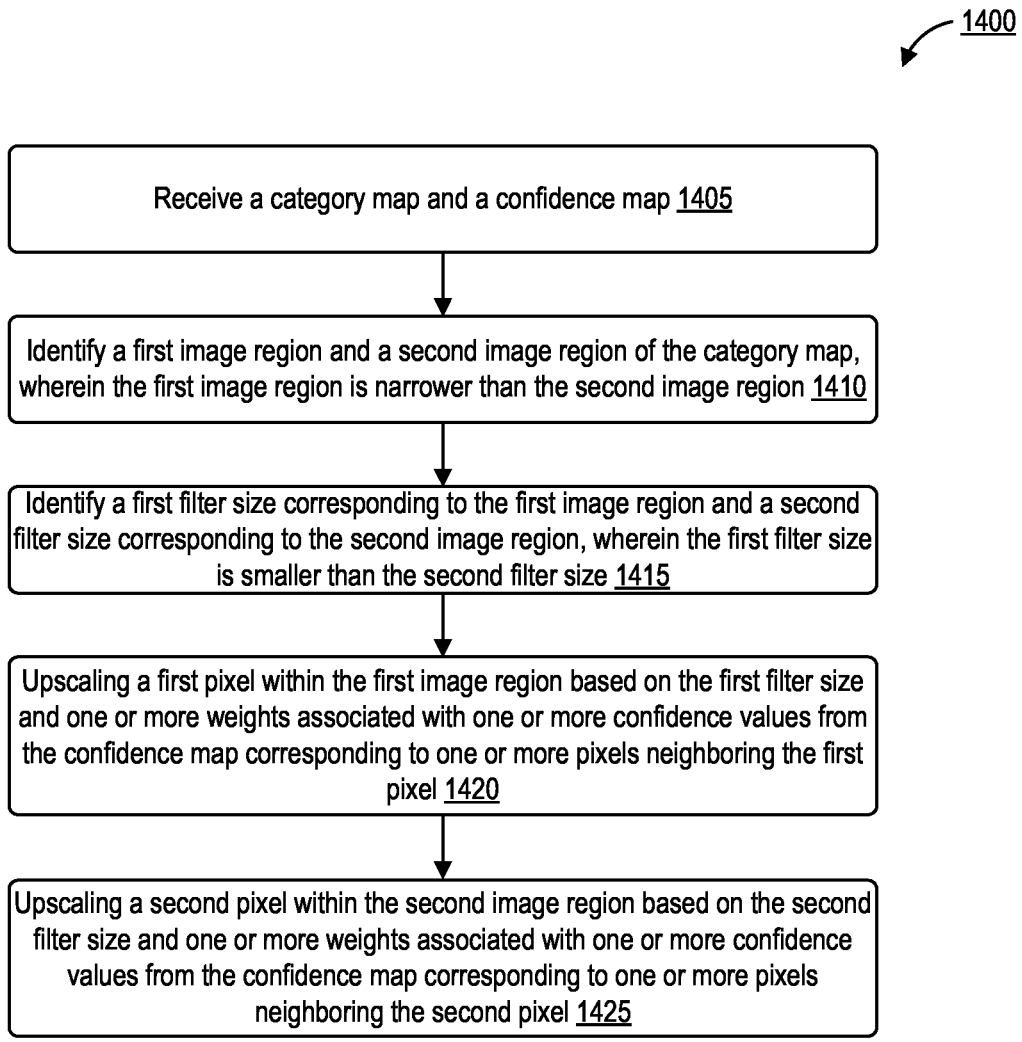
FIG. 14 is a flow diagram illustrating an image upscaling technique.

FIG. 14 is a flow diagram 1400 illustrating an image upscaling technique. The image processing technique illustrated by the flow diagram 1400 may be performed by a device. The device may be an image capture and processing device 100, an image capture device 105A, an image processing device 105B, a classification engine 220, an ISP 240, an image sensor 205, one or more network servers of a cloud service, a computing system 1500, or some combination thereof.

At operation 1405, the image upscaling technique includes receiving a category map 230 and a confidence map 235. In some cases, the category map 230 and the confidence map 235 may be a single file with both category information and confidence information for each pixel as discussed previously.

At operation 1410, the image upscaling technique includes identifying a first image region and a second image region of the category map 230, wherein the first image region is narrower than the second image region.

At operation 1415, the image upscaling technique includes identifying a first filter size corresponding to the first image region and a second filter size corresponding to the second image region, wherein the first filter size is smaller than the second filter size.

At operation 1420, the image upscaling technique includes upscaling a first pixel within the first image region based on the first filter size and one or more weights associated with one or more confidence values from the confidence map 235 corresponding to one or more pixels neighboring the first pixel. The confidence levels may be referred to as confidence levels or confidence degrees.

At operation 1425, the image upscaling technique includes upscaling a second pixel within the second image region based on the second filter size and one or more weights associated with one or more confidence values from the confidence map corresponding to one or more pixels neighboring the second pixel.

The image upscaling technique illustrated in the flow diagram 1400 may also include any operation discussed illustrated in, or discussed with respect to, any of the flow diagrams 1200, 1250, and/or 1300.

In some cases, one or more of the operations 1405-1435 of the flow diagram 1400 can be performed by a device that performs the one or more of the operations 1205-1235 of the flow diagram 1200. In some cases, the image upscaling technique of FIG. 14 may be part of the image processing technique of FIG. 12A. The image processing technique of FIG. 12A may represent at least some of the operations of the classification engine 220 and/or of the ISP 240. The image upscaling technique of FIG. 14 may represent at least some of the operations of the category map upscaler (CMUS) 905, which may be used in the upscaler 310.

In some cases, at least a subset of the techniques illustrated by the flow diagrams 1200, 1250, 1300, and 1400 may be performed remotely by one or more network servers of a cloud service. In some examples, the processes described herein (e.g., processes including operations 200, 300, 400, 700, 900, 1100, 1200, 1250, 1300, 1400, and/or other process(es) described herein) may be performed by a computing device or apparatus. In one example, the processes 200, 300, 400, 700, 900, 1100, 1200, 1250, 1300, and/or 1400 can be performed by the image capture device 105A of FIG. 1. In another example, the processes including operations 200, 300, 400, 700, 900, 1100, 1200, 1250, 1300, and/or 1400 can be performed by the image processing device 105B of FIG. 1. The processes including operations 200, 300, 400, 700, 900, 1100, 1200, 1250, 1300, and/or 1400 can also be performed by the image capture and processing system 100 of FIG. 1. The processes including operations 200, 300, 400, 700, 900, 1100, 1200, 1250, 1300, and/or 1400 can be performed by a computing device with the architecture of the computing system 1500 shown in FIG. 15. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes including operations 200, 300, 400, 700, 900, 1100, 1200, 1250, 1300, and/or 1400. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by conceptual diagrams and flow diagrams 200, 300, 400, 700, 900, 1100, 1200, 1250, 1300, 1400 are organized as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by conceptual diagrams and flow diagrams 200, 300, 400, 700, 900, 1100, 1200, 1250, 1300, 1400 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
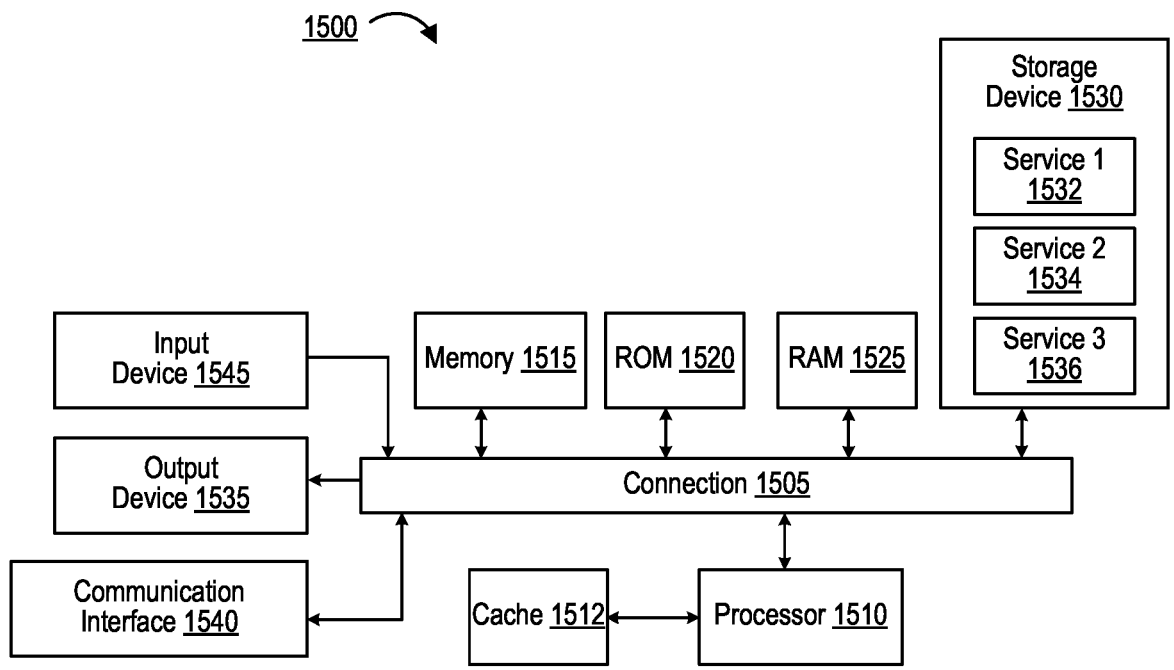
FIG. 15 is a diagram illustrating an example of a system for implementing certain aspects of the present technology.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some embodiments, computing system 1500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based Bei-Dou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some embodiments, a hardware service that performs a particular function can include the software component stored in a computer-readable medium in connection with the necessary hardware components, such as processor 1510, connection 1505, output device 1535, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: A method of processing video data. The method includes: receiving image data captured by an image sensor; determining that a first image region in the image data depicts a first category of object of a plurality of categories of object; determining that a second image region in the image data depicts a second category of object of the plurality of categories of object; generating an image based on the image data using an image capture process by applying a first setting for the image capture process to the first image region and by applying a second setting for the image capture process to the second image region.

Aspect 2: A method according to Aspect 1, further comprising: generating a category map by partitioning the image data into a plurality of image regions including the first image region and the second image region, wherein each image region of the plurality of image regions corresponds to one of the plurality of categories of object; identifying that the first category of object corresponds to the first setting for the image capture process; and identifying that the second category of object corresponds to a second setting for the image capture process.

Aspect 3: A method according to any one of Aspects 1 or 2, further comprising: generating a downscaled copy of the image data by downscaling the image data, wherein generating the category map based on the image data includes generating the category map based on the downscaled copy of the image data.

Aspect 4: A method according to any one of Aspects 1 to 3, further comprising: generating a confidence map based on the image data, the confidence map identifying a plurality of confidence levels corresponding to a plurality of portions of the image data, wherein each confidence level of the plurality of confidence levels identifies a confidence that a corresponding portion of the plurality of portions depicts one of the plurality of categories of object, and wherein generating the image includes processing the image data using an image signal processor (ISP) tuned based on the category map and the confidence map.

Aspect 5: A method according to any one of Aspects 1 to 4, further comprising: upscaling the category map.

Aspect 6: A method according to any one of Aspects 1 to 5, wherein upscaling the category map includes upscaling the category map to a size that matches a size of at least one of the image data and the image.

Aspect 7: A method according to any one of Aspects 1 to 6, wherein upscaling the category map is performed using nearest-neighbor upscaling.

Aspect 8: A method according to any one of Aspects 1 to 7, wherein upscaling the category map is performed using nearest-neighbor upscaling modified with spatial weight filtering.

Aspect 9: A method according to any one of Aspects 1 to 8, wherein upscaling the category map using the nearest-neighbor upscaling modified with spatial weight filtering comprises: identifying a first filter size corresponding to the first image region and a second filter size corresponding to the second image region, wherein the first filter size is smaller than the second filter size; upscaling a first pixel within the first image region based on the first filter size and one or more weights associated with one or more confidence values from the confidence map corresponding to one or more pixels neighboring the first pixel; and upscaling a second pixel within the second image region based on the second filter size and one or more weights associated with one or more confidence values from the confidence map corresponding to one or more pixels neighboring the second pixel.

Aspect 10: A method according to any one of Aspects 1 to 9, wherein the image capture process includes processing the image data using an image signal processor (ISP), wherein the first setting for the image capture process is a first tuning setting for the ISP, and wherein the second setting for the image capture process is a second tuning setting for the ISP.

Aspect 11: A method according to any one of Aspects 1 to 10, wherein the first tuning setting and the second tuning setting include different strengths at which a noise reduction ISP tuning parameter is applied during the processing of the image data.

Aspect 12: A method according to any one of Aspects 1 to 11, wherein the first tuning setting and the second tuning setting include different strengths at which a sharpening ISP tuning parameter is applied during the processing of the image data.

Aspect 13: A method according to any one of Aspects 1 to 12, wherein the first tuning setting and the second tuning setting include different strengths at which a color saturation ISP tuning parameter is applied during the processing of the image data.

Aspect 14: A method according to any one of Aspects 1 to 13, wherein the first tuning setting and the second tuning setting include different strengths at which a tone mapping ISP tuning parameter is applied during the processing of the image data.

Aspect 15: A method according to any one of Aspects 1 to 14, wherein the first tuning setting and the second tuning setting include different strengths at which a gamma ISP tuning parameter is applied during the processing of the image data.

Aspect 16: A method according to any one of Aspects 1 to 15, wherein the image signal processor (ISP) tuning setting for the ISP sets at least one value associated with at least one of a denoising module of the ISP, a sharpening module of the ISP, a tone mapping module of the ISP, a color saturation module of the ISP, a gamma module of the ISP, a blurring module of the ISP, a demosaicking module of the ISP, a color space conversion module of the ISP, a gain module of the ISP, a luminance module of the ISP, a shading module of the ISP, an edge enhancement module of the ISP, an image combining for high dynamic range (HDR) module of the ISP, a special effects processing module of the ISP, an artificial noise (e.g., grain) adder module of the ISP, an edge-directed upscaling module of the ISP, an autofocus module of the ISP, an auto-exposure module of the ISP, an auto white balance module of the ISP, an aperture size control module of the ISP, an shutter speed control module of the ISP, an ISO control module of the ISP, a lens position module of the ISP, an electronic image stabilization module of the ISP, and a flash control module of the ISP.

Aspect 17: A method according to any one of Aspects 1 to 16, further comprising: generating one or more modifiers, the one or more modifiers identifying at least one of a first deviation from a default tuning setting that the ISP applies in the first image region during the processing of the image data and a second deviation from the default tuning setting that the ISP applies in the second image region during the processing of the image data.

Aspect 18: A method according to any one of Aspects 1 to 17, wherein the one or more modifiers identify at least one of the first deviation and the second deviation by multiplying the one or more modifiers by the default ISP tuning setting.

Aspect 19: A method according to any one of Aspects 1 to 18, wherein the one or more modifiers identify at least one of the first deviation and the second deviation by adding the one or more modifiers to the default ISP tuning setting.

Aspect 20: A method according to any one of Aspects 1 to 19, wherein the one or more modifiers identify at least one of the first deviation and the second deviation based on increments in a list of predetermined possible ISP tuning settings that includes the default ISP tuning setting, the increments based on the modifiers.

Aspect 21: A method according to any one of Aspects 1 to 20, further comprising: generating a category map by partitioning the image data into a plurality of image regions including the first image region and the second image region, wherein each image region of the plurality of image regions corresponds to one of the plurality of categories of object, wherein the one or more modifiers are generated based on at least the category map.

Aspect 22: A method according to any one of Aspects 1 to 21, further comprising downscaling the category map before generating the one or more modifiers based on the category map.

Aspect 23: A method according to any one of Aspects 1 to 22, further comprising: generating one or more blended modifiers by blending the one or more modifiers with information corresponding to a confidence map, the confidence map identifying a plurality of confidence levels corresponding to a plurality of portions of the image data, wherein each confidence level of the plurality of confidence levels identifies a degree of confidence in determining that a corresponding portion of the plurality of portions depicts one of the plurality of categories of object.

Aspect 24: A method according to any one of Aspects 1 to 23, further comprising: generating one or more filtered modifiers by filtering the one or more blended modifiers using a low-pass filter.

Aspect 25: A method according to any one of Aspects 1 to 24, further comprising: generating one or more upscaled modifiers by upscaling the one or more filtered modifiers.

Aspect 26: A method according to any one of Aspects 1 to 25, wherein processing the image data using the ISP includes processing the image data using at least one of the one or more modifiers, the one or more blended modifiers, the one or more filtered modifiers, and the one or more upscaled modifiers.

Aspect 27: A method according to any one of Aspects 1 to 26, wherein at least one of the first setting for the image capture process and the second setting for the image capture process is a tuning setting associated with at least one of a lens position, a flash, a focus, an exposure, a white balance, an aperture size, a shutter speed, an ISO, an analog gain, a digital gain, a denoising, a sharpening, a tone mapping, a color saturation, a demosaicking, a color space conversion, a shading, an edge enhancement, an image combining for high dynamic range (HDR), a special effect, a grain addition, an artificial noise addition, an edge-directed upscaling, an upscaling, a downscaling, and an electronic image stabilization.

Aspect 28: A method according to any one of Aspects 1 to 27, wherein the image data is raw image data.

Aspect 29: A method according to any one of Aspects 1 to 28, further comprising: demosaicking the image data.

Aspect 30: A method according to any one of Aspects 1 to 29, further comprising: converting the image data from a first color space to a second color space.

Aspect 31: A method according to any one of Aspects 1 to 30, wherein the second color space is a YUV color space.

Aspect 32: An apparatus for image processing, the apparatus comprising: one or more memory units storing instructions; and one or more processors that execute the instructions, wherein execution of the instructions by the one or more processors causes the one or more processors to: perform a method according to any one of Aspects 1 to 31.

Aspect 33: A apparatus according to Aspect 32, wherein the apparatus is a mobile device Aspect 34: A apparatus according to any one of Aspects 32 or 33, wherein the apparatus is a wireless communication device.

Aspect 35: A apparatus according to any one of Aspects 32 to 34, wherein the apparatus is a camera that includes at least an image sensor and the one or more processors.

Aspect 36: A apparatus according to any one of Aspects 32 to 35, wherein the one or more processors include an image signal processor (ISP).

Aspect 37: A apparatus according to any one of Aspects 32 to 36, wherein the one or more processors include a classification engine.

Aspect 38: A apparatus according to any one of Aspects 32 to 37, wherein the apparatus includes a display configured to display the image.

Aspect 39: A non-transitory computer readable storage medium having embodied thereon a program, wherein the program is executable by a processor to perform a method of image processing, the method comprising: a method according to any one of Aspects 1 to 31.

Aspect 40: An apparatus for image processing, the apparatus comprising: means for performing a method according to any one of Aspects 1 to 31.

Aspect 41: An apparatus for image processing, the apparatus comprising: a memory; and one or more processors coupled to the memory, the one or more processors configured to: receive image data captured by an image sensor; determine that a first object image region in the image data depicts a first category of object of a plurality of categories of object; determine that a second object image region in the image data depicts a second category of object of the plurality of categories of object; identify a plurality of confidence levels corresponding to a plurality of confidence image regions of the image data, wherein each confidence level of the plurality of confidence levels identifies a confidence that a corresponding confidence image region of the plurality of confidence image regions depicts one of the plurality of categories of object; and generate an image based on the image data using an image capture process including by applying different settings for the image capture process to different portions of the image data, the different portions of the image data identified based on the first object image region, the second object image region, and the plurality of confidence image regions.

Aspect 42: The apparatus of Aspect 41, wherein the one or more processors are configured to: generate one or more modifiers, the one or more modifiers identifying at least one of a first deviation from a default setting for the image capture process for the first object image region and a second deviation from the default setting for the image capture process for the second object image region, wherein the different settings for the image capture process are based on the one or more modifiers.

Aspect 43: The apparatus of any of Aspects 41 to 42, wherein the one or more processors are configured to: adjust the one or more modifiers, including blending the one or more modifiers with a blending update that is based on the plurality of confidence levels corresponding to the plurality of confidence image regions, wherein blending the one or more modifiers with the blending update adjusts at least one of the first deviation and the second deviation in at least one area of the image data.

Aspect 44: The apparatus of any of Aspects 41 to 43, wherein the one or more processors are configured to: generate a category map partitioning the image data into a plurality of object image regions including the first object image region and the second object image region, wherein each object image region of the plurality of object image regions corresponds to one of the plurality of categories of object; identify that the first category of object corresponds to a first setting for the image capture process; and identify that the second category of object corresponds to a second setting for the image capture process.

Aspect 45: The apparatus of any of Aspects 41 to 44, wherein the one or more processors are configured to: generate a confidence map partitioning the image data into the plurality of confidence image regions corresponding to the plurality of confidence levels, the different portions of the image data identified based on the category map and the confidence map.

Aspect 46: The apparatus of any of Aspects 41 to 45, wherein the image capture process includes processing the image data using an image signal processor (ISP) of the one or more processors, wherein the different settings for the image capture process are different tuning settings for the ISP.

Aspect 47: The apparatus of any of Aspects 41 to 46, wherein the different tuning settings for the ISP include different strengths at which an ISP tuning parameter is applied during processing of the image data using the ISP, wherein the ISP tuning parameter is one of noise reduction, sharpening, color saturation, color mapping, color processing, and tone mapping.

Aspect 48: The method of any of Aspects 41 to 47, wherein the different tuning settings for the ISP include different strengths at which an ISP tuning parameter is applied during processing of the image data using the ISP, wherein the ISP tuning parameter is one of noise reduction, sharpening, color saturation, color mapping, color processing, and tone mapping.

Aspect 49: The apparatus of any of Aspects 41 to 48, wherein the different settings include a setting associated with at least one of a lens position, a flash, a focus, an exposure, a white balance, an aperture size, a shutter speed, an ISO, an analog gain, a digital gain, a denoising, a sharpening, a tone mapping, a color saturation, a demosaicking, a color space conversion, a shading, an edge enhancement, an image combining for high dynamic range (HDR), a special effect, an artificial noise addition, an edge-directed upscaling, an upscaling, a downscaling, and an electronic image stabilization.

Aspect 50: The apparatus of any of Aspects 41 to 49, wherein the one or more processors are configured to: process the image data including at least one of demosaicking the image data and converting the image data from a first color space to a second color space.

Aspect 51: The apparatus of any of Aspects 41 to 50, wherein the one or more processors are configured to: receive a user input associated with at least one of the first object image region and the second object image region, wherein at least one of the different settings is defined based on the user input and corresponds to one of the first object image region and the second object image region.

Aspect 52: The apparatus of any of Aspects 41 to 51, wherein the one or more processors include an image signal processor (ISP) that applies the different settings for the image capture process to the different portions of the image data.

Aspect 53: The apparatus of any of Aspects 41 to 52, wherein the one or more processors include a classification engine that identifies at least the first object image region and the second object image region, wherein the classification engine is at least partially positioned on an integrated circuit chip.

Aspect 54: The apparatus of any of Aspects 41 to 53, wherein the apparatus is one of a mobile device, a wireless communication device, and a camera.

Aspect 55: The apparatus of any of Aspects 41 to 54, further comprising: the image sensor.

Aspect 56: The apparatus of any of Aspects 41 to 55, further comprising: a display that displays the image.

Aspect 57: A method of image processing, the method comprising: receiving image data captured by an image sensor; determining that a first object image region in the image data depicts a first category of object of a plurality of categories of object; determining that a second object image region in the image data depicts a second category of object of the plurality of categories of object; identifying a plurality of confidence levels corresponding to a plurality of confidence image regions of the image data, wherein each confidence level of the plurality of confidence levels identifies a confidence that a corresponding confidence image region of the plurality of confidence image regions depicts one of the plurality of categories of object; and generating an image based on the image data using an image capture process including by applying different settings for the image capture process to different portions of the image data, the different portions of the image data identified based on the first object image region, the second object image region, and the plurality of confidence image regions.

Aspect 58: The method of Aspect 57, further comprising: generating one or more modifiers, the one or more modifiers identifying at least one of a first deviation from a default setting for the image capture process for the first object image region and a second deviation from the default setting for the image capture process for the second object image region, wherein the different settings for the image capture process are based on the one or more modifiers.

Aspect 59: The method of any of Aspects 57 to 58, wherein further comprising: adjust the one or more modifiers, including blending the one or more modifiers with a blending update that is based on the plurality of confidence levels corresponding to the plurality of confidence image regions, wherein blending the one or more modifiers with the blending update adjusts at least one of the first deviation and the second deviation in at least one area of the image data.

Aspect 60: The method of any of Aspects 57 to 59, further comprising: generating a category map partitioning the image data into a plurality of object image regions including the first object image region and the second object image region, wherein each object image region of the plurality of object image regions corresponds to one of the plurality of categories of object; identifying that the first category of object corresponds to a first setting for the image capture process; and identifying that the second category of object corresponds to a second setting for the image capture process.

Aspect 61: The method of any of Aspects 57 to 60, further comprising: generating a confidence map partitioning the image data into the plurality of confidence image regions corresponding to the plurality of confidence levels, the different portions of the image data identified based on the category map and the confidence map.

Aspect 62: The method of any of Aspects 57 to 61, wherein the image capture process includes processing the image data using an image signal processor (ISP) of the one or more processors, wherein the different settings for the image capture process are different tuning settings for the ISP.

Aspect 63: The method of any of Aspects 57 to 62, wherein the different settings include a setting associated with at least one of a lens position, a flash, a focus, an exposure, a white balance, an aperture size, a shutter speed, an ISO, an analog gain, a digital gain, a denoising, a sharpening, a tone mapping, a color saturation, a demosaicking, a color space conversion, a shading, an edge enhancement, an image combining for high dynamic range (HDR), a special effect, a grain addition, an artificial noise addition, an edge-directed upscaling, an upscaling, a downscaling, and an electronic image stabilization.

Aspect 64: The method of any of Aspects 57 to 63, further comprising: processing the image data, including at least one of demosaicking the image data and converting the image data from a first color space to a second color space.

Aspect 65: The method of any of Aspects 57 to 64, further comprising: receive a user input associated with at least one of the first object image region and the second object image region, wherein at least one of the different settings is defined based on the user input and corresponds to one of the first object image region and the second object image region.

Aspect 66: The method of any of Aspects 57 to 65, wherein applying the different settings for the image capture process to the different portions of the image data includes applying the different settings for the image capture process to the different portions of the image data using an image signal processor (ISP).

Aspect 67: The method of any of Aspects 57 to 66, wherein identifying the first object image region and the second object image region include identifying the first object image region and the second object image region using a classification engine that is at least partially positioned on an integrated circuit chip.

Aspect 68: The method of any of Aspects 57 to 67, further comprising: displaying the image on a display.

Aspect 69: A non-transitory computer readable storage medium having embodied thereon a program that is executable by a processor to perform a method of image processing, the method comprising: receiving image data captured by an image sensor; determining that a first object image region in the image data depicts a first category of object of a plurality of categories of object; determining that a second object image region in the image data depicts a second category of object of the plurality of categories of object; identifying a plurality of confidence levels corresponding to a plurality of confidence image regions of the image data, wherein each confidence level of the plurality of confidence levels identifies a confidence that a corresponding confidence image region of the plurality of confidence image regions depicts one of the plurality of categories of object; and generating an image based on the image data using an image capture process including by applying different settings for the image capture process to different portions of the image data, the different portions of the image data identified based on the first object image region, the second object image region, and the plurality of confidence image regions.

What is claimed is:

1. An apparatus for image processing, the apparatus comprising:
at least one memory; and
at least one processor coupled to the at least one memory, the at least one processor configured to:
receive image data captured by an image sensor;
determine that a first object image region of a plurality of object image regions in the image data depicts a first object category of a plurality of object categories and that a second object image region of the plurality of object image regions in the image data depicts a second object category of the plurality of object categories to generate a category map associated with the image data;
identify a plurality of confidence levels corresponding to a plurality of confidence image regions of a confidence map associated with the image data, wherein each confidence level of the plurality of confidence levels identifies a confidence associated with a categorization in the category map that a corresponding confidence image region of the plurality of confidence image regions depicts one of the plurality of object categories;
generate, based on the category map and the confidence map, a plurality of modifiers for a predetermined setting for an image signal processor (ISP) tuning parameter, the plurality of modifiers identifying a first deviation from the predetermined setting for a first intersection, wherein the first intersection is an intersection of the first object image region and a first confidence image region, the first confidence image region corresponding to a first confidence level, the plurality of modifiers identifying a second deviation from the predetermined setting for a second intersection, wherein the second intersection is an intersection of the first object image region and a second confidence image region, the second confidence image region corresponding to a second confidence level, the plurality of modifiers identifying a third deviation from the predetermined setting for a third intersection, wherein the third intersection is an intersection of the second object image region and a third confidence image region; and
generate an image based on the image data using the ISP tuning parameter at least in part by applying different settings for the ISP tuning parameter to different portions of the image data, the different settings for the ISP tuning parameter being based on the plurality of modifiers, the different portions of the image data including a plurality of intersections of different object image regions of the plurality of object image regions and different confidence image regions of the plurality of confidence image regions, the plurality of intersections including at least the first intersection, the second intersection, and the third intersection.

2. The apparatus of claim 1, wherein the plurality of modifiers vary in deviation from the predetermined setting based on respective confidence levels corresponding to the plurality of confidence image regions, the plurality of confidence levels including the respective confidence levels.

3. The apparatus of claim 1, the at least one processor configured to:
generate category-based modifiers based on the category map;
generate confidence-based modifiers based on the confidence map; and
combine the category-based modifiers with the confidence-based modifiers to generate the plurality of modifiers.

4. The apparatus of claim 1, wherein the category map is configured to partition the image data into the plurality of object image regions, the plurality of object image regions including at least the first object image region and the second object image region, wherein each object image region of the plurality of object image regions corresponds to one of the plurality of object categories, wherein the first object category corresponds to a first category-based deviation from the predetermined setting, and wherein the second object category corresponds to a second category-based deviation from the predetermined setting.

5. The apparatus of claim 1, wherein the confidence map is configured to partition the image data into the plurality of confidence image regions corresponding to the plurality of confidence levels, the different portions of the image data being identified based on the category map and the confidence map.

6. The apparatus of claim 1, wherein the ISP tuning parameter is used for processing the image data using an ISP of the at least one processor, wherein the different settings for the ISP tuning parameter are different tuning settings for the ISP tuning parameter of the ISP.

7. The apparatus of claim 1, wherein the different settings for the ISP tuning parameter include different strengths at which the ISP tuning parameter is applied to the image data to generate the image, wherein the ISP tuning parameter is one of noise reduction, sharpening, color saturation, color mapping, color processing, and tone mapping.

8. The apparatus of claim 1, wherein the different settings include a setting associated with at least one of a lens position, a flash, a focus, an exposure, a white balance, an aperture size, a shutter speed, an ISO, an analog gain, a digital gain, a denoising, a sharpening, a tone mapping, a color saturation, a demosaicking, a color space conversion, a shading, an edge enhancement, an image combining for high dynamic range (HDR), a special effect, an artificial noise addition, an edge-directed upscaling, an upscaling, a downscaling, and an electronic image stabilization.

9. The apparatus of claim 1, wherein the at least one processor is configured to:
process the image data including at least one of demosaicking the image data and converting the image data from a first color space to a second color space.

10. The apparatus of claim 1, wherein the at least one processor is configured to:
receive a user input associated with at least one of the first object image region and the second object image region, wherein at least one of the different settings is defined at least in part based on the user input and corresponds to one of the first object image region and the second object image region.

11. The apparatus of claim 1, wherein the at least one processor includes an ISP that applies the different settings for the ISP tuning parameter to the different portions of the image data.

12. The apparatus of claim 1, wherein the at least one processor includes a classification engine that identifies at least the first object image region and the second object image region, wherein the classification engine is at least partially positioned on an integrated circuit chip.

13. The apparatus of claim 1, wherein the apparatus is at least one of a mobile device, a wireless communication device, or a camera.

14. The apparatus of claim 1, further comprising:
the image sensor.

15. The apparatus of claim 1, further comprising:
a display that displays the image.

16. The apparatus of claim 1, wherein the predetermined setting is determined based on the image data.

17. The apparatus of claim 1, wherein the predetermined setting is determined based on one or more characteristics of the image sensor.

18. The apparatus of claim 1, wherein the image data includes raw image data.

19. A method of image processing, the method comprising:
receiving image data captured by an image sensor;
determining that a first object image region of a plurality of object image regions in the image data depicts a first object category of a plurality of object categories; and that a second object image region of the plurality of object image regions in the image data depicts a second object category of the plurality of object categories to generate a category map associated with the image data;
identifying a plurality of confidence levels corresponding to a plurality of confidence image regions of a confidence map associated with the image data, wherein each confidence level of the plurality of confidence levels identifies a confidence associated with a categorization in the category map that a corresponding confidence image region of the plurality of confidence image regions depicts one of the plurality of object categories;
generating, based on the category map and the confidence map, a plurality of modifiers for a predetermined setting for an image signal processor (ISP) tuning parameter, the plurality of modifiers identifying a first deviation from the predetermined setting for a first intersection, wherein the first intersection is an intersection of the first object image region and a first confidence image region, the first confidence image region corresponding to a first confidence level, the plurality of modifiers identifying a second deviation from the predetermined setting for a second intersection, wherein the second intersection is an intersection of the first object image region and a second confidence image region, the second confidence image region corresponding to a second confidence level, the plurality of modifiers identifying a third deviation from the predetermined setting for a third intersection, wherein the third intersection is an intersection of the second object image region and a third confidence image region; and
generating an image based on the image data using the ISP tuning parameter at least in part by applying different settings for the ISP tuning parameter to different portions of the image data, the different settings for the ISP tuning parameter being based on the one or more plurality of modifiers, the different portions of the image data including a plurality of intersections of different object image regions of the plurality of object image regions and different confidence image regions of the plurality of confidence image regions, the plurality of intersections including at least the first intersection, the second intersection, and the third intersection.

20. The method of claim 19, wherein the plurality of modifiers vary in deviation from the predetermined setting based on respective confidence levels corresponding to the plurality of confidence image regions, the plurality of confidence levels including the respective confidence levels.

21. The method of claim 19, further comprising:
generating category-based modifiers based on the category map;
generating confidence-based modifiers based on the confidence map; and
combining the category-based modifiers with the confidence-based modifiers to generate the plurality of modifiers.

22. The method of claim 19, wherein the category map is configured to partition the image data into the plurality of object image regions, the plurality of object image regions including at least the first object image region and the second object image region, wherein each object image region of the plurality of object image regions corresponds to one of the plurality of object categories, wherein the first object category corresponds to a first category-based deviation from the predetermined setting, and wherein the second object category corresponds to a second category-based deviation from the predetermined setting.

23. The method of claim 22, wherein the confidence map is configured to partition the image data into the plurality of confidence image regions corresponding to the plurality of confidence levels, the different portions of the image data identified based on the category map and the confidence map.

24. The method of claim 19, wherein the ISP tuning parameter is used for processing the image data using an ISP, wherein the different settings for the ISP tuning parameter are different tuning settings for the ISP tuning parameter of the ISP.

25. The method of claim 19, wherein the different settings for the ISP tuning parameter include different strengths at which the ISP tuning parameter is applied to the image data to generate the image, wherein the ISP tuning parameter is one of noise reduction, sharpening, color saturation, color mapping, color processing, and tone mapping.

26. The method of claim 19, wherein the different settings include a setting associated with at least one of a lens position, a flash, a focus, an exposure, a white balance, an aperture size, a shutter speed, an ISO, an analog gain, a digital gain, a denoising, a sharpening, a tone mapping, a color saturation, a demosaicking, a color space conversion, a shading, an edge enhancement, an image combining for high dynamic range (HDR), a special effect, an artificial noise addition, an edge-directed upscaling, an upscaling, a downscaling, and an electronic image stabilization.

27. The method of claim 19, further comprising:
processing the image data, including at least one of demosaicking the image data and converting the image data from a first color space to a second color space.

28. The method of claim 19, further comprising:
receiving a user input associated with at least one of the first object image region and the second object image region, wherein at least one of the different settings is defined based at least in part on the user input and corresponds to one of the first object image region and the second object image region.

29. The method of claim 19, wherein applying the different settings for the ISP tuning parameter to the different portions of the image data includes applying the different settings for the ISP tuning parameter to the different portions of the image data using an ISP.

30. The method of claim 19, wherein identifying the first object image region and the second object image region include identifying the first object image region and the second object image region using a classification engine that is at least partially positioned on an integrated circuit chip.

31. The method of claim 19, further comprising:
displaying the image on a display.

32. A non-transitory computer readable storage medium having embodied thereon a program that is executable by a processor to perform a method of image processing, the method comprising:
receiving image data captured by an image sensor;
determining that a first object image region of a plurality of object image regions in the image data depicts a first object category of a plurality of object categories; and that a second object image region of the plurality of object image regions in the image data depicts a second object category of the plurality of object categories to generate a category map associated with the image data;
identifying a plurality of confidence levels corresponding to a plurality of confidence image regions of a confidence map associated with the image data, wherein each confidence level of the plurality of confidence levels identifies a confidence associated with a categorization in the category map that a corresponding confidence image region of the plurality of confidence image regions depicts one of the plurality of object categories;
generating, based on the category map and the confidence map, a plurality of modifiers for a predetermined setting for an image signal processor (ISP) tuning parameter, the plurality of modifiers identifying a first deviation from the predetermined setting for a first intersection, wherein the first intersection is an intersection of the first object image region and a first confidence image region, the first confidence image region corresponding to a first confidence level, the plurality of modifiers identifying a second deviation from the predetermined setting for a second intersection, wherein the second intersection is an intersection of the first object image region and a second confidence image region, the second confidence image region corresponding to a second confidence level, the plurality of modifiers identifying a third deviation from the predetermined setting for a third intersection, wherein the third intersection is an intersection of the second object image region and a third confidence image region; and
generating an image based on the image data using the ISP tuning parameter at least in part by applying different settings for the ISP tuning parameter to different portions of the image data, the different settings for the ISP tuning parameter being based on the plurality of modifiers, the different portions of the image data including a plurality of intersections of different object image regions of the plurality of object image regions and different confidence image regions of the plurality of confidence image regions, the plurality of intersections including at least the first intersection, the second intersection, and the third intersection.

* * * * *